US012524874B2

(12) United States Patent
Machii

(10) Patent No.: US 12,524,874 B2
(45) Date of Patent: Jan. 13, 2026

(54) IMAGE PROCESSING DEVICE, LEARNING DEVICE, IMAGE PROCESSING METHOD, LEARNING METHOD, IMAGE PROCESSING PROGRAM, AND LEARNING PROGRAM THAT CAN ACCURATELY DETECT A LESION FROM A MEDICAL IMAGE USING A LESION DETECTION MODEL

(71) Applicant: FUJIFILM CORPORATION, Tokyo (JP)

(72) Inventor: Yusuke Machii, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 341 days.

(21) Appl. No.: 17/822,136

(22) Filed: Aug. 25, 2022

(65) Prior Publication Data

US 2023/0081693 A1 Mar. 16, 2023

(30) Foreign Application Priority Data

Sep. 15, 2021 (JP) ................................ 2021-150539

(51) Int. Cl.
*G06T 7/00* (2017.01)
*G06V 10/764* (2022.01)
*G06V 10/774* (2022.01)

(52) U.S. Cl.
CPC .......... *G06T 7/0012* (2013.01); *G06V 10/764* (2022.01); *G06V 10/774* (2022.01);
(Continued)

(58) Field of Classification Search
None
See application file for complete search history.

(56) References Cited

U.S. PATENT DOCUMENTS

2006/0274928 A1 12/2006 Collins et al.
2014/0119506 A1* 5/2014 Kang ................... A61B 6/583
378/54
(Continued)

FOREIGN PATENT DOCUMENTS

CN 108464840 A * 8/2018 ............... G06T 7/44
CN 111192679 A 5/2020
(Continued)

OTHER PUBLICATIONS

English language translation of the following: Office action dated Jan. 28, 2025 from the JPO in a Japanese patent application No. 2021-150539 corresponding to the instant patent application. This office action translation is submitted now in order to supplement the understanding of the cited references which are being disclosed in the instant Information Disclosure Statement.

*Primary Examiner* — Akwasi M Sarpong
*Assistant Examiner* — Pawan Dhingra
(74) *Attorney, Agent, or Firm* — SOLARIS Intellectual Property Group, PLLC

(57) ABSTRACT

A learning device includes at least one processor. The processor acquires a medical image to be detected, acquires apparatus identification information for identifying an imaging apparatus that has captured the medical image to be detected, selects any one of a plurality of lesion detection models, which detect a lesion from the medical image, on the basis of the apparatus identification information, and detects the lesion from the medical image to be detected, using the selected lesion detection model.

6 Claims, 17 Drawing Sheets

(52) U.S. Cl.
CPC .............. *G06T 2207/30096* (2013.01); *G06V 2201/032* (2022.01)

(56) References Cited

U.S. PATENT DOCUMENTS

| | | |
|---|---|---|
| 2018/0338741 A1 | 11/2018 | Lyman et al. |
| 2020/0090810 A1 | 3/2020 | Sakaguchi |
| 2020/0279652 A1 | 9/2020 | Nenoki et al. |
| 2021/0272278 A1 | 9/2021 | Terai et al. |
| 2021/0338179 A1* | 11/2021 | Tian ........................ G06N 3/096 |
| 2023/0029394 A1* | 1/2023 | Park ........................ G06T 7/0012 |
| 2023/0057933 A1* | 2/2023 | Hayashida ............. G16H 50/70 |
| 2024/0134983 A1* | 4/2024 | Kato ..................... G06F 21/566 |

FOREIGN PATENT DOCUMENTS

| | | | | |
|---|---|---|---|---|
| CN | 108464840 B | | 10/2021 | |
| CN | 115023171 A | * | 9/2022 | ........... G06T 7/0012 |
| JP | 2008-253681 A | | 10/2008 | |
| JP | 2008-541889 A | | 11/2008 | |
| JP | 2020-42810 A | | 3/2020 | |
| JP | 6815711 B1 | | 1/2021 | |
| JP | 2021-79013 A | | 5/2021 | |
| JP | 2021079013 A | * | 5/2021 | |
| JP | 2021-140757 A | | 9/2021 | |
| WO | 2019/102950 A1 | | 5/2019 | |
| WO | WO-2020003992 A1 | * | 1/2020 | ............ A61B 1/045 |
| WO | WO-2021153648 A1 | * | 8/2021 | ........... G06T 7/0012 |

* cited by examiner

IMAGE PROCESSING DEVICE, LEARNING DEVICE, IMAGE PROCESSING METHOD, LEARNING METHOD, IMAGE PROCESSING PROGRAM, AND LEARNING PROGRAM THAT CAN ACCURATELY DETECT A LESION FROM A MEDICAL IMAGE USING A LESION DETECTION MODEL

CROSS-REFERENCE TO RELATED APPLICATIONS

The present application claims priority under 35 U.S.C. § 119 to Japanese Patent Application No. 2021-150539 filed on Sep. 15, 2021. The above application is hereby expressly incorporated by reference, in its entirety, into the present application.

BACKGROUND

1. Technical Field

The present disclosure relates to an image processing device, a learning device, an image processing method, a learning method, an image processing program, and a learning program.

2. Description of the Related Art

A doctor or the like diagnoses a lesion of an object using a medical image captured by irradiating the object with radiation, ultrasound, or the like. As a technique for assisting a diagnosis by a doctor or the like, a technique is known which detects a lesion from a radiographic image using a so-called model which is also called a discriminator or a recognizer. For example, JP6815711B discloses a technique that has a plurality of models and that performs detection using a model corresponding to the type of examination, the skill level of interpretation by a doctor or the like, or the like.

SUMMARY

In the technique disclosed in JP6815711B, the accuracy of detecting the lesion may not be sufficient. For example, in the technique disclosed in JP6815711B, the accuracy of detecting the lesion may be reduced due to a variation in the quality of the medical image to be detected.

The present disclosure has been made in view of the above circumstances, and an object of the present disclosure is to provide an image processing device, a learning device, an image processing method, a learning method, an image processing program, and a learning program that can accurately detect a lesion from a medical image using a lesion detection model.

In order to achieve the above object, according to a first aspect of the present disclosure, there is provided an image processing device comprising at least one processor. The processor acquires a medical image to be detected, acquires apparatus identification information for identifying an imaging apparatus that has captured the medical image to be detected, selects any one of a plurality of lesion detection models, which detect a lesion from the medical image, on the basis of the apparatus identification information, and detects the lesion from the medical image to be detected, using the selected lesion detection model.

According to a second aspect of the present disclosure, in the image processing device according to the first aspect, the plurality of lesion detection models may include a lesion detection model corresponding to a type of the imaging apparatus and a general-purpose lesion detection model regardless of the type of the imaging apparatus.

According to a third aspect of the present disclosure, in the image processing device according to the second aspect, in a case in which the apparatus identification information is not acquirable, the processor may select the general-purpose lesion detection model.

According to a fourth aspect of the present disclosure, in the image processing device according to the second aspect or the third aspect, in a case in which the lesion detection model corresponding to the type of the imaging apparatus identified by the apparatus identification information is not included in the plurality of lesion detection models, the processor may select the general-purpose lesion detection model.

According to a fifth aspect of the present disclosure, in the image processing device according to any one of the first to fourth aspects, the apparatus identification information may include manufacturer identification information for identifying a manufacturer of the imaging apparatus, and the processor may select any one of the plurality of lesion detection models on the basis of the manufacturer identification information.

According to a sixth aspect of the present disclosure, in the image processing device according to any one of the first to fifth aspects, the apparatus identification information may include model identification information for identifying a model of the imaging apparatus, and the processor may select any one of the plurality of lesion detection models on the basis of the model identification information.

According to a seventh aspect of the present disclosure, in the image processing device according to any one of the first to fourth aspects, the plurality of lesion detection models may be a plurality of lesion detection models that have been trained for each of a plurality of classes classified according to a quality of the medical image, and the processor may determine which of the plurality of classes the medical image to be detected is classified into and select a lesion detection model corresponding to the determined class from the plurality of lesion detection models.

In addition, according to an eighth aspect of the present disclosure, there is provided a learning device comprising at least one processor. The processor generates a first lesion detection model using one or more first medical images captured by one or more first imaging apparatuses including at least an imaging apparatus other than a second imaging apparatus and a ground truth label which corresponds to the first medical image and which relates to a lesion to be learned included in the first medical image, and retrains the first lesion detection model, using one or more second medical images captured by the second imaging apparatus and a ground truth label which corresponds to the second medical image and which relates to a lesion to be learned included in the second medical image, to generate a second lesion detection model for the second imaging apparatus.

According to a ninth aspect of the present disclosure, there is provided an image processing method that is executed by a computer. The image processing method comprises: acquiring a medical image to be detected; acquiring apparatus identification information for identifying an imaging apparatus that has captured the medical image to be detected; selecting any one of a plurality of lesion detection models, which detect a lesion from the medical image, on the basis of the apparatus identification information; and detecting the lesion from the medical image to be detected, using the selected lesion detection model.

According to a tenth aspect of the present disclosure, there is provided a learning method that is executed by a computer. The learning method comprises: generating a first lesion detection model using one or more first medical images captured by one or more first imaging apparatuses including at least an imaging apparatus other than a second imaging apparatus and a ground truth label which corresponds to the first medical image and relates to a lesion to be learned included in the first medical image; and retraining the first lesion detection model, using one or more second medical images captured by the second imaging apparatus and a ground truth label which corresponds to the second medical image and relates to a lesion to be learned included in the second medical image, to generate a second lesion detection model for the second imaging apparatus.

According to an eleventh aspect of the present disclosure, there is provided an image processing program that causes a computer to execute a process comprising: acquiring a medical image to be detected; acquiring apparatus identification information for identifying an imaging apparatus that has captured the medical image to be detected; selecting any one of a plurality of lesion detection models, which detect a lesion from the medical image, on the basis of the apparatus identification information; and detecting the lesion from the medical image to be detected, using the selected lesion detection model.

According to a twelfth aspect of the present disclosure, there is provided a learning program that causes a computer to train a lesion detection model detecting a lesion included in a medical image. The learning program causes the computer to execute a process comprising: generating a first lesion detection model using one or more first medical images captured by one or more first imaging apparatuses including at least an imaging apparatus other than a second imaging apparatus and a ground truth label which corresponds to the first medical image and which relates to a lesion to be learned included in the first medical image; and retraining the first lesion detection model, using one or more second medical images captured by the second imaging apparatus and a ground truth label which corresponds to the second medical image and which relates to a lesion to be learned included in the second medical image, to generate a second lesion detection model for the second imaging apparatus.

According to the present disclosure, it is possible to accurately detect a lesion from a medical image using a lesion detection model.

BRIEF DESCRIPTION OF THE DRAWINGS

Exemplary embodiments according to the technique of the present disclosure will be described in detail based on the following figures, wherein.

DETAILED DESCRIPTION

Hereinafter, an embodiment of the present disclosure will be described in detail with reference to the drawings. In addition, this embodiment does not limit the present disclosure. Further, in the following embodiment, an aspect will be described in which a radiographic image is applied as an example of a medical image according to the present disclosure and a mammography apparatus 10 is applied as an example of an imaging apparatus according to the present disclosure.

Figure 1:
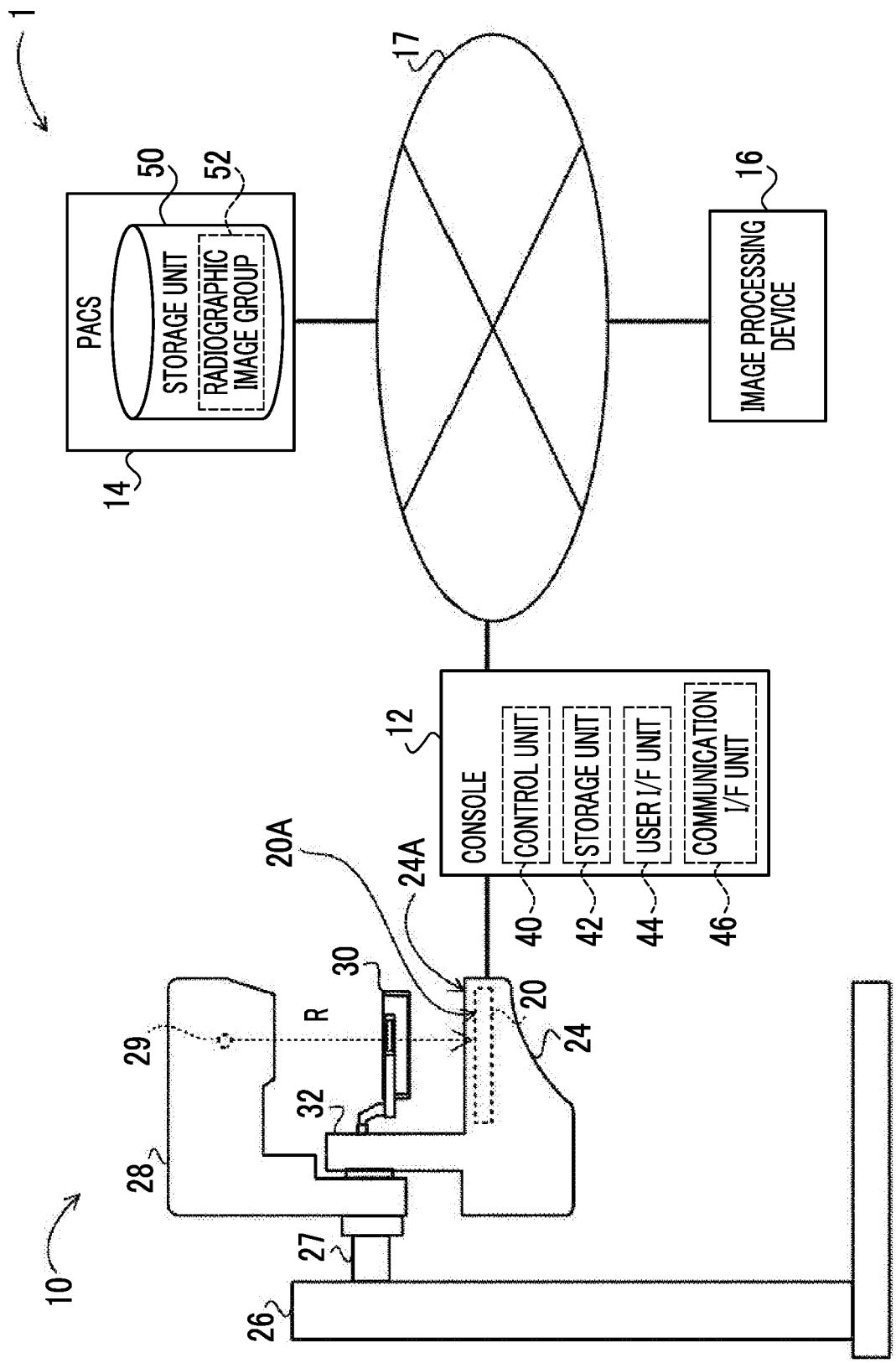
FIG. 1 is a diagram schematically illustrating an example of an overall configuration of a radiography system according to an embodiment.

First, an example of the overall configuration of a radiography system according to this embodiment will be described. FIG. 1 is a diagram illustrating an example of the overall configuration of a radiography system 1 according to this embodiment. As illustrated in FIG. 1, the radiography system 1 according to this embodiment comprises the mammography apparatus 10, a console 12, a picture archiving and communication system (PACS) 14, and an image processing device 16. The console 12, the PACS 14, and the image processing device 16 are connected by wired communication or wireless communication through a network 17.

First, the mammography apparatus 10 according to this embodiment will be described. FIG. 1 is a side view illustrating an example of the outward appearance of the mammography apparatus 10 according to this embodiment. In addition, FIG. 1 illustrates an example of the outward appearance of the mammography apparatus 10 as viewed from a left side of a subject.

The mammography apparatus 10 according to this embodiment is an apparatus that is operated under control of the console 12 and that irradiates a breast of the subject as an object with radiation R (for example, X-rays) emitted from a radiation source 29 to capture a radiographic image of the breast. Further, the mammography apparatus 10 according to this embodiment has a function of performing normal imaging that captures images at an irradiation position where the radiation source 29 is disposed along a normal direction to a detection surface 20A of a radiation detector 20 and so-called tomosynthesis imaging (will be described in detail below) that captures images while moving the radiation source 29 to each of a plurality of irradiation positions.

As illustrated in FIG. 1, the mammography apparatus 10 comprises an imaging table 24, a base 26, an arm portion 28, and a compression unit 32.

The radiation detector 20 is provided in the imaging table 24. In the mammography apparatus 10 according to this embodiment, in a case in which imaging is performed, the breast of the subject is positioned on an imaging surface 24A of the imaging table 24 by a user.

The radiation detector 20 detects the radiation R transmitted through the breast which is the object. Specifically, the radiation detector 20 detects the radiation R that has entered the breast of the subject and the imaging table 24 and that has reached the detection surface 20A of the radiation detector 20, generates a radiographic image on the basis of the detected radiation R, and outputs image data indicating the generated radiographic image. In the following description, in some cases, a series of operations of emitting the radiation R from the radiation source 29 and generating a radiographic image using the radiation detector 20 is referred to as "imaging". The type of the radiation detector 20 according to this embodiment is not particularly limited. For example, the radiation detector 20 may be an indirect-conversion-type radiation detector that converts the radiation R into light and converts the converted light into charge or a direct-conversion-type radiation detector that directly converts the radiation R into charge.

A compression plate 30 used for compressing the breast during imaging is attached to the compression unit 32 provided on the imaging table 24 and is moved in a direction (hereinafter, referred to as an "up-down direction") toward or away from the imaging table 24 by a compression plate driving unit (not illustrated) that is provided in the compression unit 32. The compression plate 30 is moved in the up-down direction to compress the breast of the subject between the imaging table 24 and the compression plate 30.

The arm portion 28 can be rotated with respect to the base 26 by a shaft portion 27. The shaft portion 27 is fixed to the base 26, and the shaft portion 27 and the arm portion 28 are rotated integrally. Gears are provided in each of the shaft portion 27 and the compression unit 32 of the imaging table 24. The gears can be switched between an engaged state and a non-engaged state to switch between a state in which the compression unit 32 of the imaging table 24 and the shaft portion 27 are connected and rotated integrally and a state in which the shaft portion 27 is separated from the imaging table 24 and runs idle. In addition, components for switching between the transmission and non-transmission of power of the shaft portion 27 are not limited to the gears, and various mechanical elements may be used. Each of the arm portion 28 and the imaging table 24 can be relatively rotated with respect to the base 26, using the shaft portion 27 as a rotation axis.

In a case in which the tomosynthesis imaging is performed in the mammography apparatus 10, the radiation source 29 is sequentially moved to each of a plurality of irradiation positions having different irradiation angles by the rotation of the arm portion 28. The radiation source 29 includes a radiation tube (not illustrated) that generates the radiation R, and the radiation tube is moved to each of the plurality of irradiation positions according to the movement of the radiation source 29. In addition, the irradiation angle of the radiation R means an angle formed between a normal line to the detection surface 20A of the radiation detector 20 and a radiation axis. The radiation axis means an axis that connects the focus of the radiation source 29 at each irradiation position and a preset position such as the center of the detection surface 20A. Further, here, it is assumed that the detection surface 20A of the radiation detector 20 is substantially parallel to the imaging surface 24A.

Meanwhile, in a case in which the normal imaging is performed in the mammography apparatus 10, the radiation source 29 remains at an irradiation position 19 (an irradiation position along the normal direction) where the irradiation angle is 0 degrees. The radiation source 29 emits the radiation R in response to an instruction from the console 12, and the radiation detector 20 captures a radiographic image.

The mammography apparatus 10 and the console 12 are connected by wired communication or wireless communication. The radiographic image captured by the radiation detector 20 in the mammography apparatus 10 is output to the console 12 by wired communication or wireless communication through a communication interface (I/F) unit (not illustrated).

As illustrated in FIG. 1, the console 12 according to this embodiment comprises a control unit 40, a storage unit 42, a user I/F unit 44, and a communication I/F unit 46.

As described above, the control unit 40 of the console 12 has a function of controlling the capture of the radiographic image of the breast by the mammography apparatus 10. An example of the control unit 40 is a computer system comprising a central processing unit (CPU), a read only memory (ROM), and a random access memory (RAM).

The storage unit 42 has a function of storing, for example, information related to the acquisition of a radiographic image or the radiographic image acquired from the mammography apparatus 10. The storage unit 42 is a non-volatile storage unit and is, for example, a hard disk drive (HDD) or a solid state drive (SSD).

The user I/F unit 44 includes input devices, such as various buttons and switches operated by a user, such as a radiology technician, regarding the capture of a radiographic image, and display devices, such as lamps and displays, that display information related to imaging and the radiographic images obtained by imaging.

The communication I/F unit 46 transmits and receives various kinds of data, such as information related to the acquisition of radiographic images and the radiographic images, to and from the mammography apparatus 10 using wired communication or wireless communication. In addition, the communication I/F unit 46 transmits and receives various kinds of data, such as radiographic images, to and from the PACS 14 and the image processing device 16 through the network 17 using wired communication or wireless communication.

Further, as illustrated in FIG. 1, the PACS 14 according to this embodiment comprises a storage unit 50 that stores a radiographic image group 52 and a communication I/F unit (not illustrated). The radiographic image group 52 includes, for example, the radiographic image captured by the mammography apparatus 10 acquired from the console 12 through the communication I/F unit (not illustrated).

The image processing device 16 has a function of training a lesion detection model and a function of detecting a lesion from a radiographic image using the lesion detection model which will each be described in detail below. The image processing device 16 according to this embodiment is an example of an image processing device and of a learning device according to the present disclosure.

Figure 2:
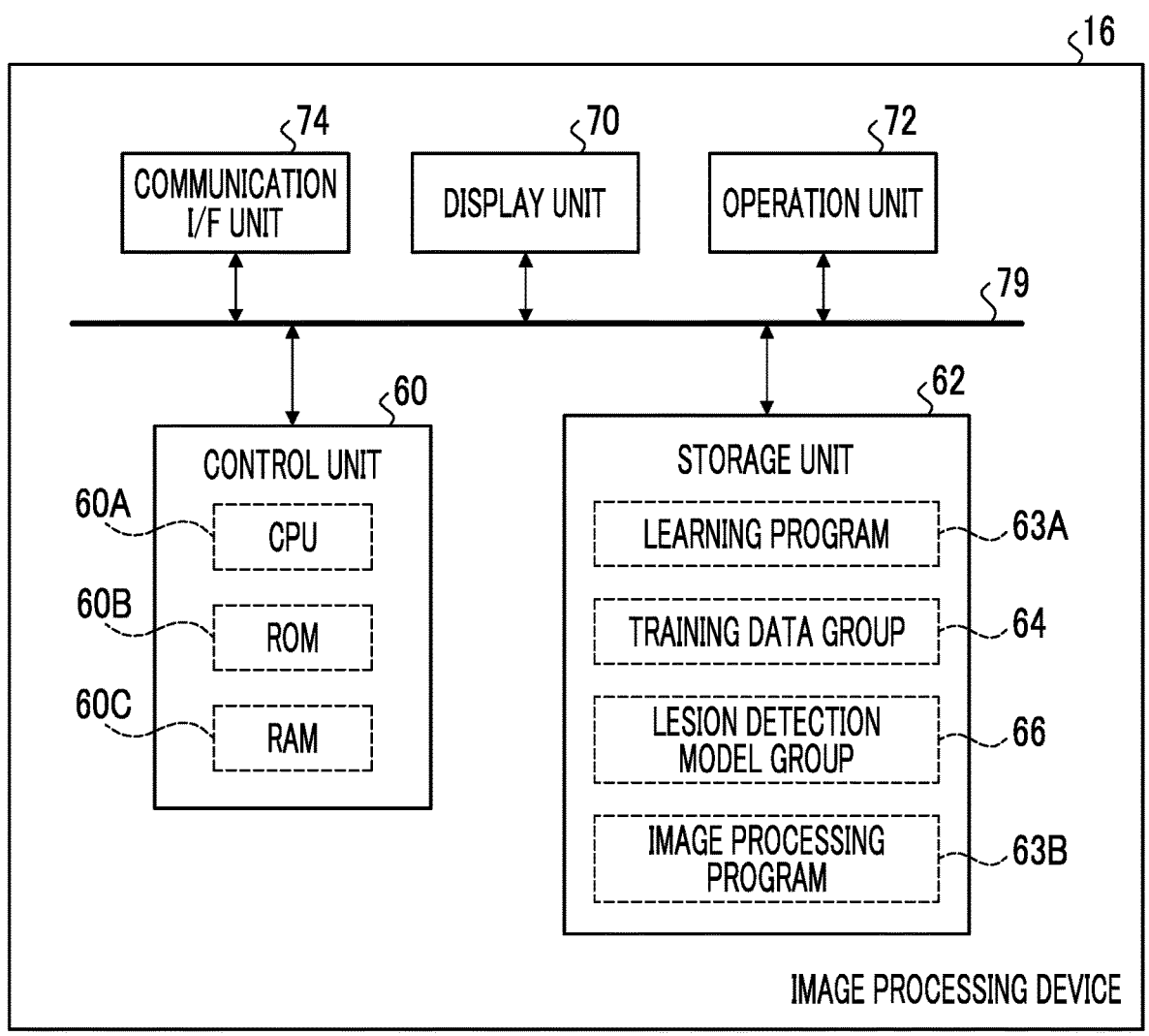
FIG. 2 is a block diagram illustrating an example of a configuration of an image processing device according to the embodiment.

FIG. 2 is a block diagram illustrating an example of the configuration of the image processing device 16 according to this embodiment. As illustrated in FIG. 2, the image processing device 16 according to this embodiment comprises a control unit 60, a storage unit 62, a display unit 70, an operation unit 72, and a communication I/F unit 74. The control unit 60, the storage unit 62, the display unit 70, the operation unit 72, and the communication I/F unit 74 are connected to each other through a bus 79, such as a system bus or a control bus, such that they can transmit and receive various kinds of information.

The control unit 60 controls the overall operation of the image processing device 16. The control unit 60 comprises a CPU 60A, a ROM 60B, and a RAM 60C. Various programs and the like used by the CPU 60A for control are stored in the ROM 60B in advance. The RAM 60C temporarily stores various kinds of data.

The storage unit 62 is a non-volatile storage unit and is, for example, an HDD or an SSD. The storage unit 62 stores various programs such as a learning program 63A and an image processing program 63B which will each be described in detail below. In addition, the storage unit 62 stores various kinds of information such as a training data group 64 and a lesion detection model group 66. The lesion detection model group 66 according to this embodiment is an example of a plurality of lesion detection models according to the present disclosure.

Figure 3:
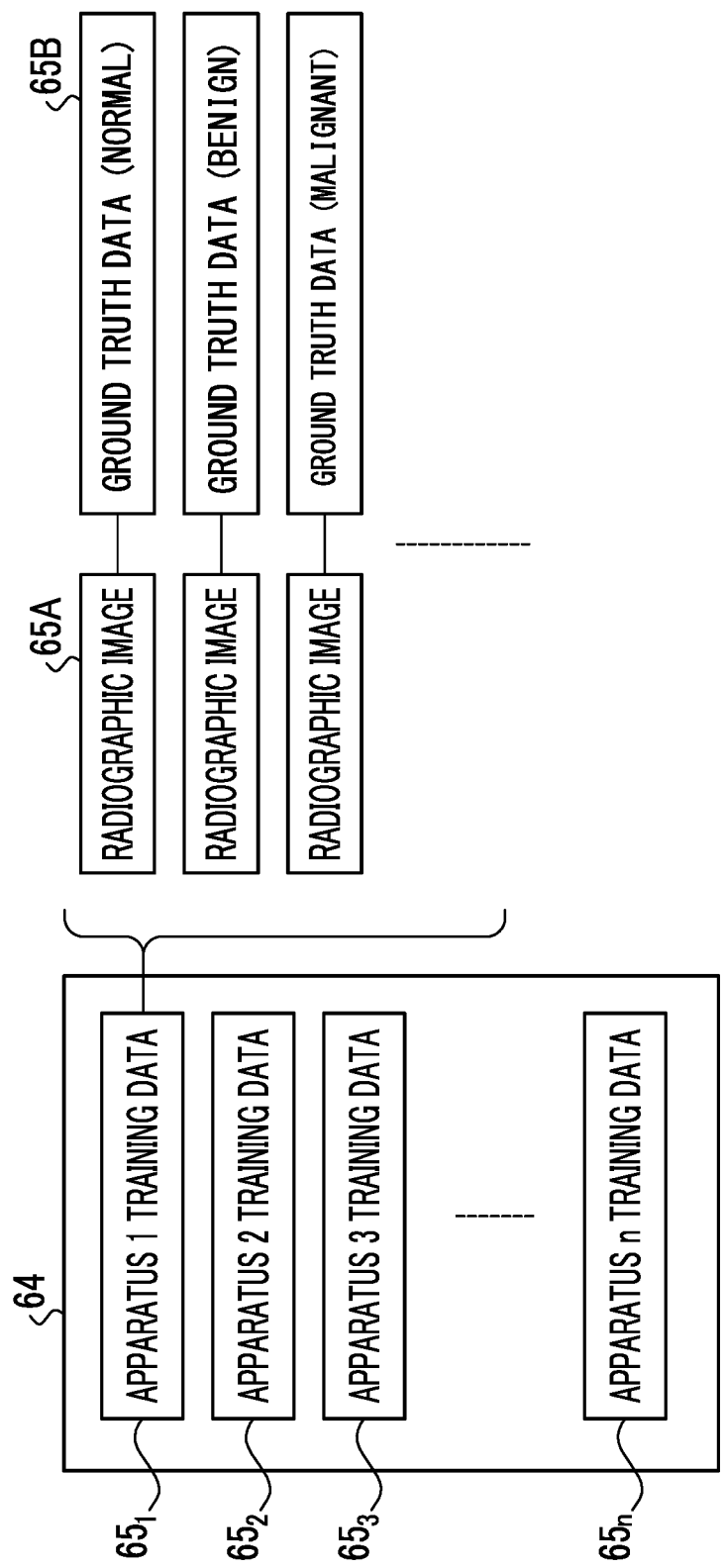
FIG. 3 is a diagram illustrating an example of a training data group.

FIG. 3 illustrates an example of the training data group 64 according to this embodiment. In this embodiment, training data 65 is prepared for each type of mammography apparatus that captures radiographic images. For example, the training data group 64 according to this embodiment includes apparatus 1 training data $65_1$ to apparatus n training data $65_n$ corresponding to n types of mammography apparatuses (apparatuses 1 to n). In the example illustrated in FIG. 3, the apparatus 1 training data $65_1$ is training data 65 for apparatus 1, and the apparatus 2 training data $65_2$ is training data 65 for apparatus 2, the apparatus 3 training data $65_3$ is training data 65 for apparatus 3, and apparatus n training data $65_n$ is training data 65 for apparatus n. In this embodiment, in a case in which the apparatus 1 training data $65_1$ to the apparatus n training data $65_n$ are collectively referred to without being distinguished from each other, they are simply referred to as "training data 65" without being denoted by reference numerals 1 to n for identifying individual data.

In this embodiment, examples of the "type" of the mammography apparatus include a type classified by the manufacturer of the mammography apparatus 10 and the model of the mammography apparatus. Further, for example, in a case in which different types of image processing software are used in the mammography apparatuses or the corresponding consoles, the mammography apparatuses or the corresponding consoles may be different types. Furthermore, for example, the types may be classified according to the quality of the radiographic images captured by the mammography apparatuses.

As illustrated in FIG. 3, the training data 65 has a plurality of sets of radiographic images 65A and ground truth data 65B. The ground truth data 65B is information indicating whether a lesion in the breast included in the corresponding radiographic image 65A is normal (no lesion has occurred), benign, or malignant. The training data 65 includes a plurality of sets of radiographic images 65A and ground truth data 65B indicating that the lesion is normal (no lesion has occurred), a plurality of sets of radiographic images 65A and ground truth data 65B indicating that the lesion is benign, and a plurality of sets of radiographic images 65A and ground truth data 65B indicating that the lesion is malignant. In addition, in this embodiment, the doctor sets whether the lesion of the breast included in the radiographic image 65A is normal (no lesion has occurred), benign, or malignant as the ground truth data 65B. The ground truth data 65B according to this embodiment is an example of a ground truth label according to the present disclosure. Further, a mask image and information on a mask region in the mask image may be used as an example of the ground truth data 65B. In this case, examples of the information on the mask region include the type of lesion in the mask region, whether the lesion is malignant or benign, and the degree of malignancy.

Figure 4:
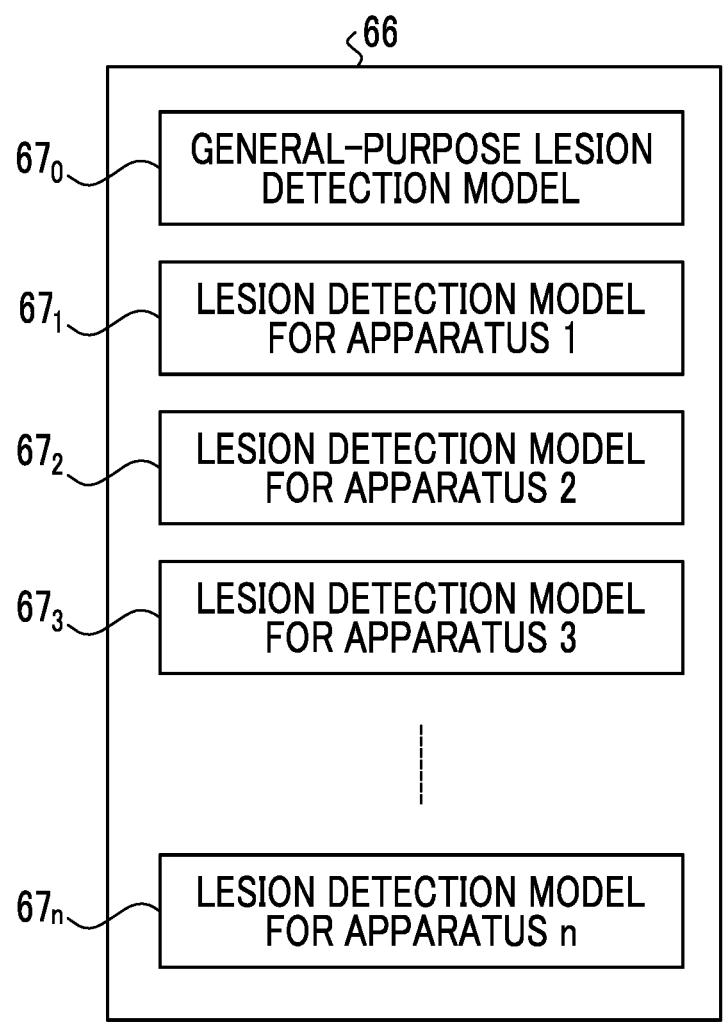
FIG. 4 is a diagram illustrating an example of a lesion detection model group.

Meanwhile, FIG. 4 illustrates an example of the lesion detection model group 66 according to this embodiment. In this embodiment, a lesion detection model 67 is prepared for each type of mammography apparatus that captures radiographic images. For example, the lesion detection model group 66 according to this embodiment includes a lesion detection model $67_1$ for apparatus 1 to a lesion detection model $67_n$ for apparatus n which correspond to n types of mammography apparatuses (apparatuses 1 to n). In the example illustrated in FIG. 4, the lesion detection model $67_1$ for apparatus 1 is a lesion detection model 67 for apparatus 1, the lesion detection model $67_2$ for apparatus 2 is a lesion detection model 67 for apparatus 2, the lesion detection model $67_3$ for apparatus 3 is a lesion detection model 67 for apparatus 3, and the lesion detection model $67_n$ for apparatus n is a lesion detection model 67 for apparatus n.

Further, as illustrated in FIG. 4, the lesion detection model group 66 according to this embodiment includes a general-purpose lesion detection model $67_0$. The general-purpose lesion detection model $67_0$ is a lesion detection model 67 that is generally used for the image of the imaging apparatus from which apparatus identification information is not acquirable or for which the lesion detection model is absent.

In this embodiment, the general-purpose lesion detection model $67_0$ is a lesion detection model 67 that is generally used in a case in which the apparatus identification information of the mammography apparatus that has captured the radiographic image to be detected is not acquirable or in a case in which the mammography apparatus does not correspond to any of apparatuses 1 to n for which the lesion detection models are prepared.

In this embodiment, in a case in which the general-purpose lesion detection model $67_0$ and the lesion detection model $67_1$ for apparatus 1 to the lesion detection model $67_n$ for apparatus n are collectively referred to without being distinguished from each other, they are simply referred to as "lesion detection models 67" without being denoted by reference numerals 0 to n for identifying the individual lesion detection models.

The display unit 70 displays radiographic images or various kinds of information. The display unit 70 is not particularly limited, and various displays and the like may be used. In addition, the operation unit 72 is used by the user to input instructions for a diagnosis of the lesion of the breast using a radiographic image by a doctor, various kinds of information, or the like. The operation unit 72 is not particularly limited. Examples of the operation unit 72 include various switches, a touch panel, a touch pen, and a mouse. In addition, the display unit 70 and the operation unit 72 may be integrated into a touch panel display.

The communication I/F unit 74 transmits and receives various kinds of information to and from the console 12 and the PACS 14 through the network 17 using wireless communication or wired communication.

A function of detecting a lesion from a radiographic image using the lesion detection model 67 in the image processing device 16 according to this embodiment will be described. First, the lesion detection model 67 in the image processing device 16 according to this embodiment will be described. For example, the lesion detection model 67 according to this embodiment detects whether the lesion of the breast is normal (no lesion has occurred), benign, or malignant from the radiographic image including the breast.

Figure 5:
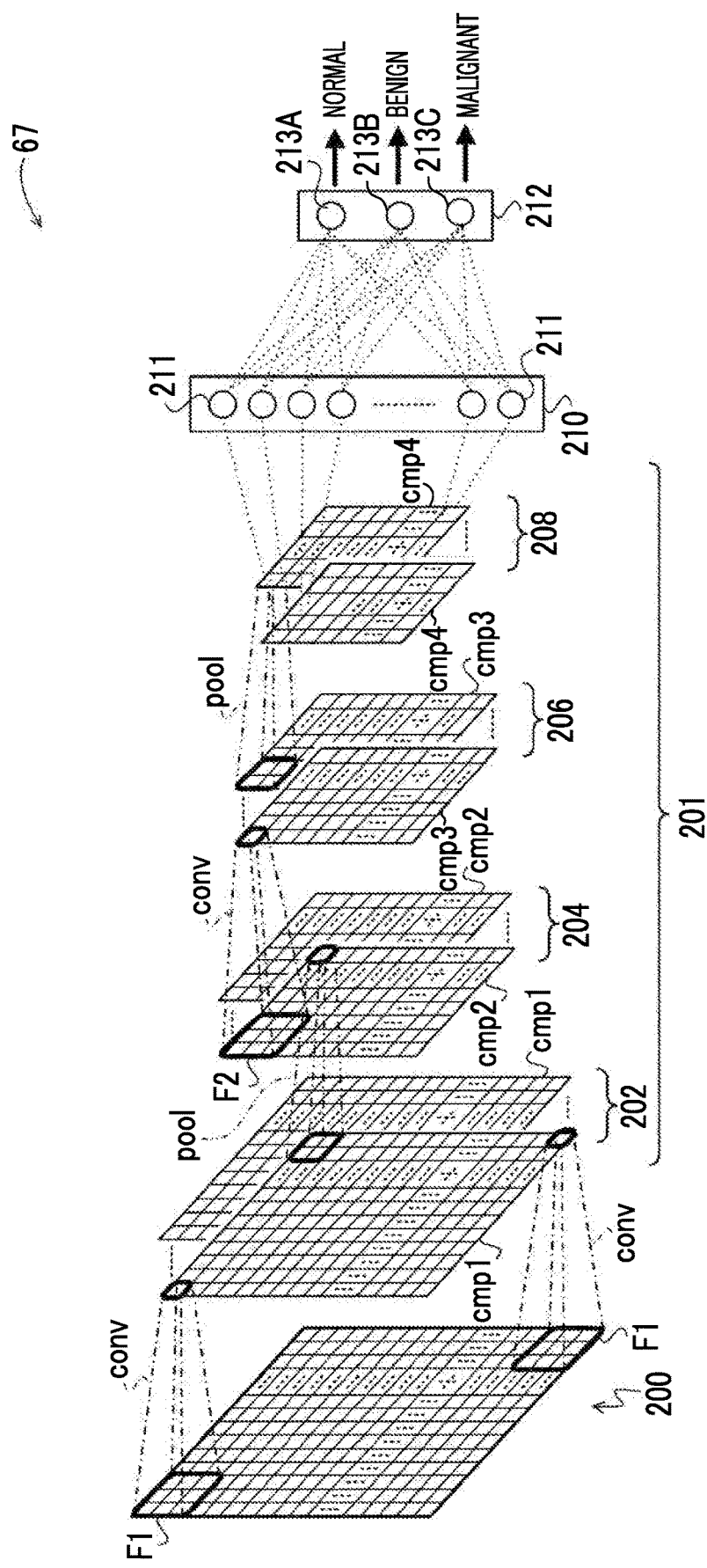
FIG. 5 is a diagram illustrating an example of a lesion detection model.

For example, in this embodiment, a convolutional neural network (CNN) that has been subjected to machine learning by deep learning using the training data group 64 is used as the lesion detection model 67. FIG. 5 illustrates an example of the lesion detection model 67 according to this embodiment.

The lesion detection model 67 illustrated in FIG. 5 comprises an input layer 200, a middle layer 201, a flat layer 210, and an output layer 212. An image (a radiographic image in this embodiment) to be processed is input to the input layer 200. The input layer 200 transmits information of each pixel (every pixel) of the input image to be processed to the middle layer 201 without any change. For example, in a case in which the image to be processed has a size of 28 pixels×28 pixels and is grayscale data, the size of the data transmitted from the input layer 200 to the middle layer 201 is 28×28×1=784.

The middle layer 201 includes convolution layers 202 and 206 that perform a convolution process (cony) and pooling layers 204 and 208 that perform a pooling process (pool).

Figure 6:
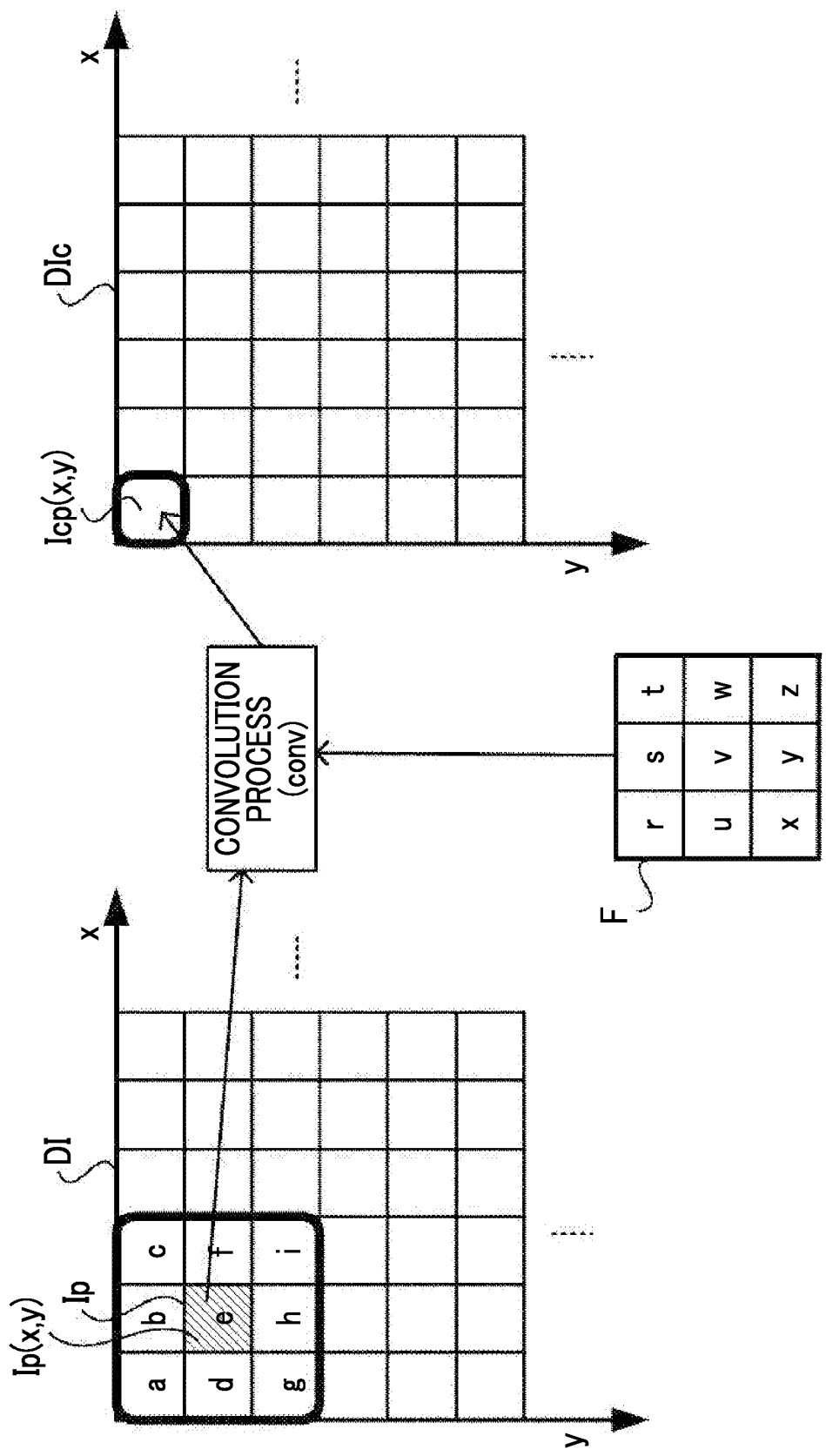
FIG. 6 is a diagram illustrating a convolution process.

The convolution process performed by the convolution layers 202 and 206 will be described with reference to FIG. 6. As illustrated in FIG. 6, in the convolution process, in a case in which a pixel value Ip(x, y) of a pixel of interest Ip in input data DI is "e", the pixel values of the surrounding adjacent pixels are "a" to "d" and "f" to "i", and coefficients of a 3×3 filter F are "r" to "z", a pixel value Icp(x, y) of a pixel Icp in output data DIc, which is the result of a convolution operation for the pixel of interest Ip, is obtained according to, for example, the following Expression (1). In addition, the coefficient of the filter F corresponds to a weight indicating the strength of the connection between nodes of the previous and next layers.

$$Icp(x,y)=a \times z+b \times y+c \times x+d \times w+e \times v+f \times u+g \times t+h \times s+i \times r \quad (1)$$

In the convolution process, the above-mentioned convolution operation is performed for each pixel, and the pixel value Icp(x, y) corresponding to each pixel of interest Ip is output. In this way, the output data DIc having the pixel values Icp(x, y) that are two-dimensionally arranged is output. One output data item DIc is output for one filter F. In a case in which a plurality of filters F of different types are used, the output data DIc is output for each filter F. The filter F means a neuron (node) of the convolution layer, and the features that can be extracted are determined for each filter F. Therefore, the number of features that can be extracted from one input data item DI in the convolution layer is the number of filters F.

Further, in the pooling layers 204 and 208, a pooling process that reduces the original image while maintaining the features is performed. In other words, in the pooling layers 204 and 208, a pooling process that selects a local representative value and reduces the resolution of the input image to reduce the size of the image is performed. For example, in a case in which the pooling process of selecting a representative value from a block of 2×2 pixels is performed with a stride of "1", that is, by shifting the pixel one by one, a reduced image obtained by reducing the size of the input image by half is output.

In this embodiment, as illustrated in FIG. 5, the convolution layers 202 and 206 and the pooling layers 204 and 208 are disposed in the order of the convolution layer 202, the pooling layer 204, the convolution layer 206, and the pooling layer 208 from the side closest to the input layer 200.

As illustrated in FIG. 5, the convolution layer 202 applies a 3×3 filter F1 to the input (transmitted) image to perform the above-mentioned convolution operation and outputs an image feature map cmp1 from which the features of the input image have been extracted and in which pixel values are two-dimensionally arranged. As described above, the number of image feature maps cmp1 corresponds to the type of filter F1.

The pooling layer 204 performs the pooling process of selecting a representative value from a block of 2×2 pixels for the image feature map cmp1 to reduce the size of the image feature map cmp1 to ¼ (the vertical and horizontal sizes are reduced to ½) and outputs a plurality of image feature maps cmp2.

Similarly to the convolution layer 202, the convolution layer 206 applies a 3×3 filter F2 to perform the above-mentioned convolution operation and outputs a plurality of image feature maps cmp3 from which the features of the input image feature maps cmp2 have been extracted and in which pixel values are two-dimensionally arranged.

Similarly to the pooling layer 204, the pooling layer 208 performs the pooling process of selecting a representative value from a block of 2×2 pixels for the image feature map cmp3 to reduce the size of the image feature map cmp3 to ¼ (the vertical and horizontal sizes are reduced to ½) and outputs a plurality of image feature maps cmp4.

The flat layer 210 after the middle layer 201 rearranges data in a state in which the numerical value of the data is maintained as the image feature map cmp4. For example, as illustrated in FIG. 5, the flat layer 210 rearranges three-dimensional data indicated by a plurality of image feature maps cmp4 as one-dimensional data. As illustrated in FIG. 5, the value of each node 211 included in the flat layer 210 corresponds to the pixel value of each pixel of the plurality of image feature maps cmp4.

The output layer 212 is a fully connected layer to which all of the nodes 211 are connected and includes a node 213A corresponding to the detection that no lesion has occurred, that is, the lesion is normal, a node 213B corresponding to the detection that the lesion is benign, and a node 213C corresponding to the detection that the lesion is malignant.

The output layer 212 outputs a probability corresponding to the detection that the lesion is normal, which corresponds to the node 213A, a probability corresponding to the detection that the lesion is benign, which corresponds to the node 213B, and a probability corresponding to the detection that the lesion is malignant, which corresponds to the node 213C, using a softmax function which is an example of an activation function.

The lesion detection model 67 outputs a detection result indicating that the lesion is normal in a case in which the probability of the node 213A is higher than the probability of each of the node 213B and the node 213C in the output layer 212. On the other hand, the lesion detection model 67 outputs a detection result indicating that the lesion is benign in a case in which the probability of the node 213B is higher than the probability of each of the node 213A and the node 213C in the output layer 212. Further, the lesion detection model 67 outputs a detection result indicating that the lesion is malignant in a case in which the probability of the node 213C is equal to or higher than the probability of each of the node 213A and the node 213B in the output layer 212.

Figure 7:
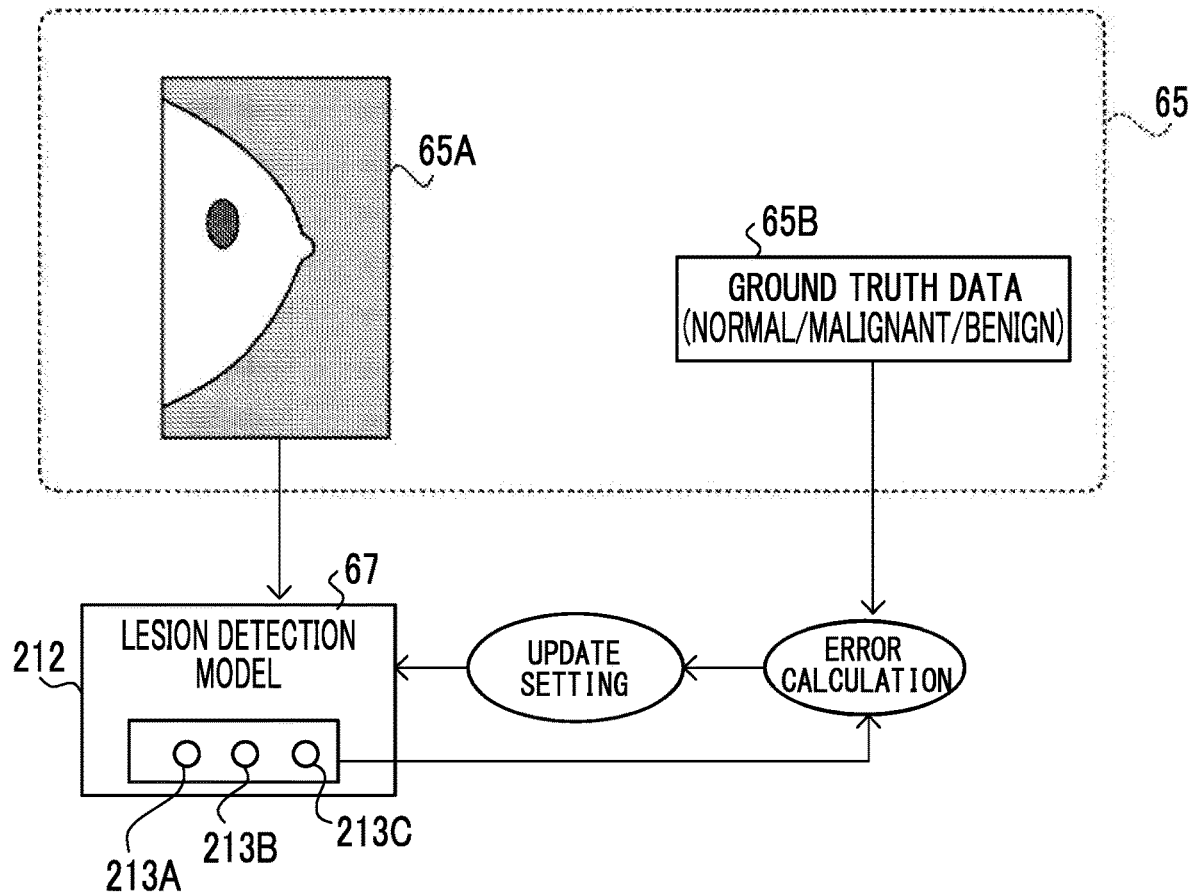
FIG. 7 is a diagram illustrating an example of the training of the lesion detection model in the image processing device according to the embodiment.

The image processing device 16 performs machine learning on the machine learning model using the training data group 64 to generate the lesion detection model 67 according to this embodiment. An example of a learning phase in which the image processing device 16 performs machine learning on the lesion detection model 67 will be described with reference to FIG. 7.

As described above, the training data 65 is composed of a set of the radiographic image 65A and the ground truth data 65B (see FIG. 3). In this embodiment, machine learning is performed on the lesion detection model 67 using a back-propagation method.

In the learning phase, the radiographic image 65A is input to the lesion detection model 67. In addition, the radiographic image 65A may be divided into a plurality of batches (images), and the divided batches may be sequentially input to the lesion detection model 67 for training.

The lesion detection model 67 outputs each of the values of the nodes 213A to 213C included in the output layer 212 of the lesion detection model 67 as the detection result related to the lesion of the breast included in the radiographic image 65A.

In a case in which the ground truth data 65B for the radiographic image 65A input to the lesion detection model 67 is "normal", the value of the node 213A needs to be "1", and the values of the node 213B and the node 213C need to be "0". Further, in a case in which the ground truth data 65B for the radiographic image 65A input to the lesion detection model 67 is "benign", the values of the node 213A and the node 213C needs to be "0", and the value of the node 213B needs to be "1". Furthermore, in a case in which the ground truth data 65B for the radiographic image 65A input to the lesion detection model 67 is "malignant", the values of the node 213A and the node 213B need to be "0", and the value of the node 213C needs to be "1".

Therefore, the difference (error) between the values of the nodes 213A to 213C output from the lesion detection model 67 and the values to be taken by the nodes 213A to 213C corresponding to the ground truth data 65B is calculated. The error corresponds to a loss function. Then, an update setting of the weight for each neuron and an update setting of the weight indicating the strength of the connection between the nodes of the previous and next layers, which is the coefficient of each filter F, are performed to reduce the error from the output layer 212 to the input layer 200 using an error propagation method according to the error, and the lesion detection model 67 is updated according to the update settings.

In the learning phase, a series of processes of the input of the radiographic image 65A of the training data 65 to the lesion detection model 67, the output of each of the values of the nodes 213A to 213C included in the output layer 212 from the lesion detection model 67, the calculation of the error based on each of the values of the nodes 213A to 213C and on the ground truth data 65B, the update setting of the weight, and the update of the lesion detection model 67 is repeatedly performed.

In this embodiment, first, the general-purpose lesion detection model $67_0$ is trained using all of the training data 65 included in the training data group 64. Then, the general-purpose lesion detection model $67_0$ is retrained using the training data 65 for each of host apparatuses 1 to n to generate the lesion detection model 67 for each host apparatus. For example, the general-purpose lesion detection model $67_0$ is retrained using the apparatus 1 training data $65_1$ to generate the lesion detection model $67_1$ for apparatus 1.

Figure 8:
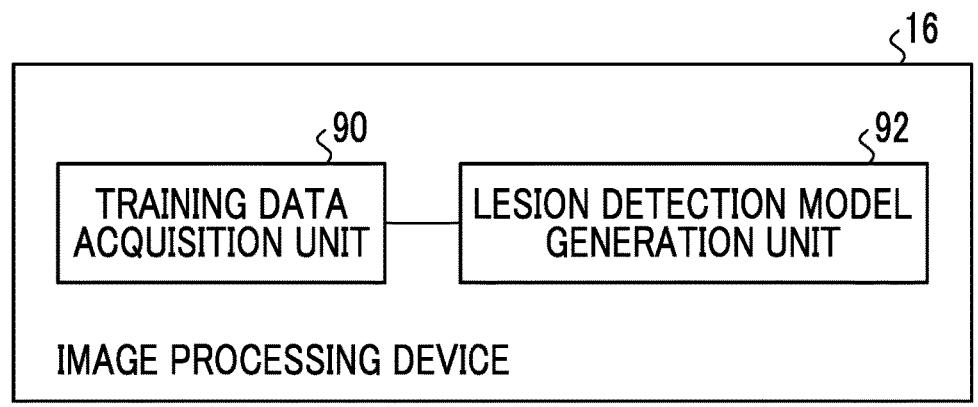
FIG. 8 is a functional block diagram illustrating an example of a configuration related to a function of generating the lesion detection model in the image processing device according to the embodiment.

FIG. 8 is a functional block diagram illustrating an example of a configuration related to a function of generating the lesion detection model 67 in the image processing device 16 according to this embodiment. As illustrated in FIG. 8, the image processing device 16 comprises a training data acquisition unit 90 and a lesion detection model generation unit 92. For example, in the image processing device 16 according to this embodiment, the CPU 60A of the control unit 60 executes the learning program 63A stored in the storage unit 62 to function as the training data acquisition unit 90 and as the lesion detection model generation unit 92.

The training data acquisition unit 90 has a function of acquiring the training data 65 corresponding to the lesion detection model 67 to be trained from the training data group 64 stored in the storage unit 62. The training data acquisition unit 90 outputs the acquired training data 65 to the lesion detection model generation unit 92.

The lesion detection model generation unit 92 has a function of performing machine learning on the machine learning model using the training data 65 as described above to generate the lesion detection model 67 that receives a radiographic image as an input and that outputs a detection result related to the lesion of the breast included in the radiographic image. The lesion detection model generation unit 92 stores the generated lesion detection model 67 in the storage unit 62.

Next, the operation of the image processing device 16 according to this embodiment in the learning phase will be described with reference to FIG. 9. The CPU 60A executes the learning program 63A stored in the storage unit 62 such that a learning process illustrated in FIG. 9 is performed.

Figure 9:
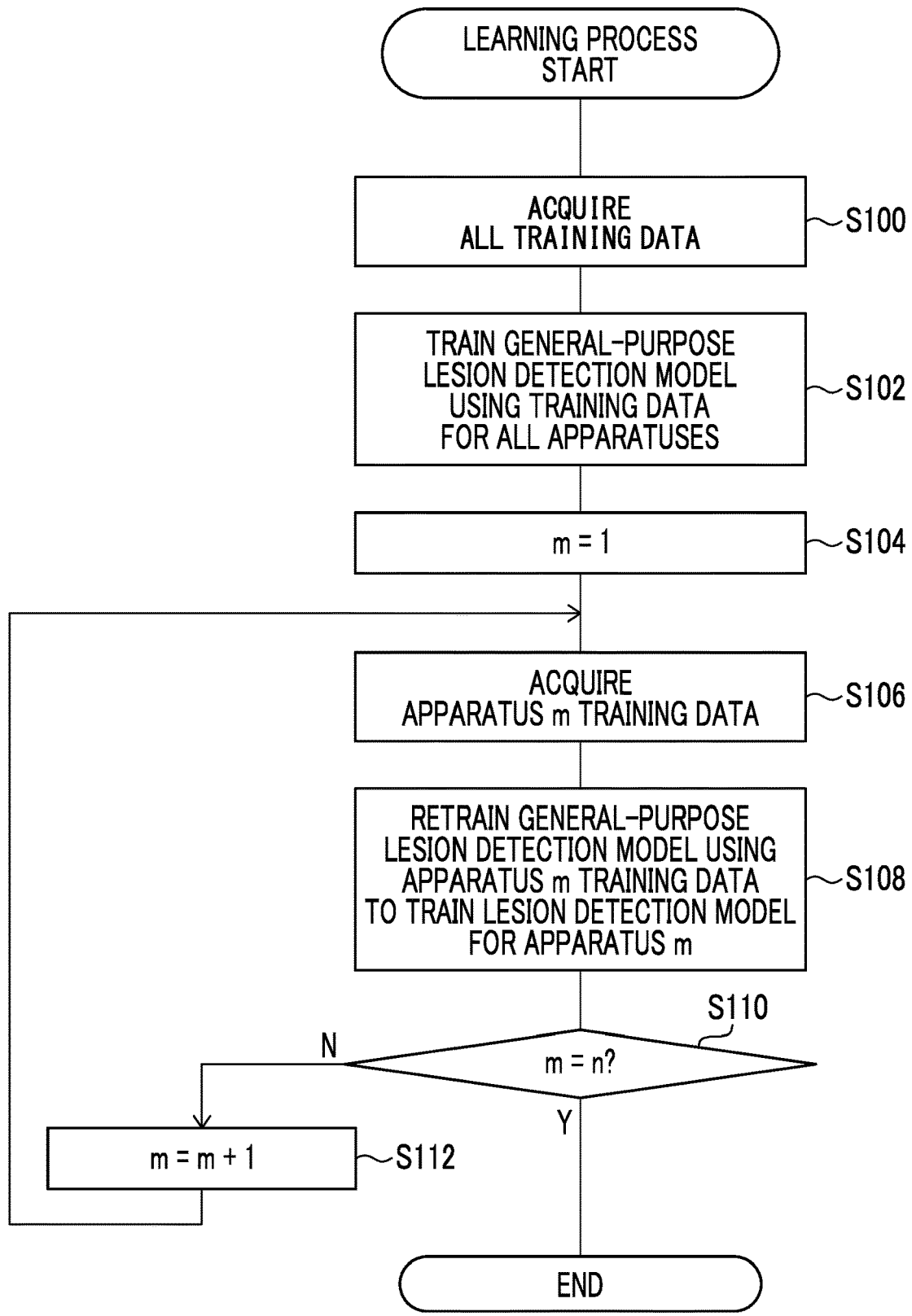
FIG. 9 is a flowchart illustrating an example of the flow of a learning process by the image processing device according to the embodiment.

In Step S100 of FIG. 9, the training data acquisition unit 90 acquires all of the training data 65 included in the training data group 64 from the storage unit 62 as described above.

Then, in Step S102, the lesion detection model generation unit 92 trains the general-purpose lesion detection model $67_0$ using the training data 65 acquired in Step S100. As described above, the lesion detection model generation unit 92 trains the general-purpose lesion detection model $67_0$ using all of the training data 65 included in the training data group 64, that is, the apparatus 1 training data $65_1$ to the apparatus n training data $65_n$. The lesion detection model generation unit 92 repeatedly performs a series of processes of the input of the radiographic image 65A to the machine learning model, the output of each of the values of the nodes 213A to 213C included in the output layer 212 of the machine learning model, the calculation of the error between each of the values of the nodes 213A to 213C and the ground truth data 65B, the update setting of the weight, and the update of the machine learning model to train the general-purpose lesion detection model $67_0$. The lesion detection model generation unit 92 stores the trained general-purpose lesion detection model $67_0$ in the storage unit 62.

The number of sets of the radiographic images 65A and the ground truth data 65B included in each of the apparatus 1 training data $65_1$ to the apparatus n training data $65_n$ may be different. Therefore, the loss function in a case in which the general-purpose lesion detection model $67_0$ is trained may be weighted according to the number of sets of the radiographic images 65A and the ground truth data 65B. For example, the weight is increased as the number of sets of the radiographic images 65A and the ground truth data 65B is decreased such that training is sufficiently performed even in a case in which the number of sets of the radiographic images 65A and the ground truth data 65B included in the training data 65 is small. Specifically, training may be performed using the reciprocal of the number of sets of the radiographic images 65A and the ground truth data 65B included in the training data 65 as the loss function.

Then, in Step S104, the lesion detection model generation unit 92 sets a variable m for managing the lesion detection model 67 to be trained to "1" (m=1).

Then, in Step S106, the training data acquisition unit 90 acquires apparatus m training data $65_m$ included in the training data group 64 from the storage unit 62 as described above. For example, in a case in which m is 1, the training data acquisition unit 90 acquires the apparatus 1 training data $65_1$.

Then, in Step S108, the lesion detection model generation unit 92 retrains the general-purpose lesion detection model $67_0$ using the apparatus m training data $65_m$ acquired in Step S106 to train the lesion detection model $67_m$ for apparatus m. The lesion detection model generation unit 92 repeatedly performs a series of processes of the input of the radiographic image 65A included in the apparatus m training data $65_m$ to the general-purpose lesion detection model $67_0$, the output of each of the values of the nodes 213A to 213C included in the output layer 212 of the general-purpose lesion detection model $67_0$, the calculation of the error between each of the values of the nodes 213A to 213C and the ground truth data 65B, the update setting of the weight, and the update of the general-purpose lesion detection model $67_0$ to retrain the general-purpose lesion detection model $67_0$, thereby training the lesion detection model $67_m$ for apparatus m. For example, the lesion detection model generation unit 92 repeatedly performs a series of processes of the input of the radiographic image 65A included in the apparatus 1 training data $65_1$ to the general-purpose lesion detection model $67_0$, the calculation of the error between each of the values of the nodes 213A to 213C of the general-purpose lesion detection model $67_0$ and the ground truth data 65B, the update setting of the weight, the update of the general-purpose lesion detection model $67_0$, and the like to retrain the general-purpose lesion detection model $67_0$, thereby training the lesion detection model $67_1$ for apparatus 1.

The lesion detection model generation unit 92 stores the trained lesion detection model $67_m$ for apparatus m in the storage unit 62.

Then, in Step S110, the lesion detection model generation unit 92 determines whether or not the variable m is equal to the number of types of mammography apparatuses ("n" in this embodiment) (m=n). That is, it is determined whether or not the lesion detection models 67 corresponding to all of the types of mammography apparatuses 1 to n have been generated. In a case in which the variable m is not equal to n, that is, in a case in which there is a mammography apparatus for which the lesion detection model 67 has not yet been generated, the determination result in Step S110 is "No", and the process proceeds to Step S112.

In Step S112, the lesion detection model generation unit 92 adds "1" to the variable m (m=m+1), returns to Step S106, and repeats the processes in Steps S106 to S110.

On the other hand, in a case in which the variable m is equal to n, that is, in a case in which the lesion detection models 67 corresponding to all of the types of mammography apparatuses have been generated, the determination result in Step S110 is "Yes", and the learning process illustrated in FIG. 9 ends.

In addition, apparatuses 1 to n in the learning process according to this embodiment are an example of a first imaging apparatus according to the present disclosure, and apparatus m in the learning process according to this embodiment is an example of a second imaging apparatus according to the present disclosure. Further, the general-purpose lesion detection model 67 in the learning process according to this embodiment is an example of a first lesion detection model according to the present disclosure, and the lesion detection model $67_m$ for apparatus m in the learning process according to this embodiment is an example of a second lesion detection model according to the present disclosure.

The lesion detection model group 66 including a plurality of lesion detection models 67 generated by the learning phase of the image processing device 16 as described above is used in an operation phase in which the image processing device 16 detects lesions from radiographic images. The function of detecting lesions from the radiographic images in the image processing device 16 according to this embodiment will be described in detail.

Figure 10:
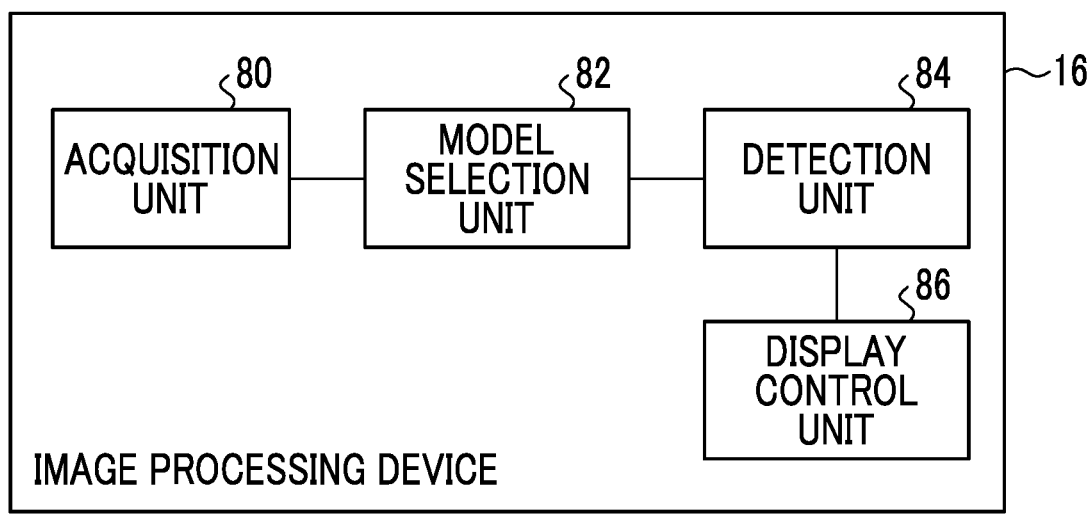
FIG. 10 is a functional block diagram illustrating an example of a configuration related to a function of detecting a lesion in the image processing device according to the embodiment.

FIG. 10 is a functional block diagram illustrating an example of a configuration related to a function of detecting a lesion in the image processing device 16. As illustrated in FIG. 10, the image processing device 16 comprises an acquisition unit 80, a model selection unit 82, a detection unit 84, and a display control unit 86. For example, in the image processing device 16 according to this embodiment, the CPU 60A of the control unit 60 executes the image processing program 63B stored in the storage unit 62 to function as the acquisition unit 80, the model selection unit 82, the detection unit 84, and the display control unit 86.

The acquisition unit 80 has a function of acquiring the radiographic image to be detected. The acquisition unit 80 acquires a desired radiographic image from the console 12 of the mammography apparatus 10 or from the PACS 14 on the basis of, for example, an image interpretation instruction from the doctor. Then, the acquisition unit 80 outputs the acquired radiographic image to the model selection unit 82.

The model selection unit 82 has a function of acquiring apparatus identification information for identifying the mammography apparatus 10 that has captured the radiographic image acquired by the acquisition unit 80 and selecting any one of the lesion detection models 67 from the lesion detection model group 66 on the basis of the apparatus identification information. Specifically, the model selection unit 82 according to this embodiment identifies which of the types of apparatuses 1 to n the mammography apparatus that has captured the radiographic image to be detected corresponds to on the basis of the apparatus identification information and selects the lesion detection model 67 corresponding to the identified type from the lesion detection model group 66.

Figure 11:
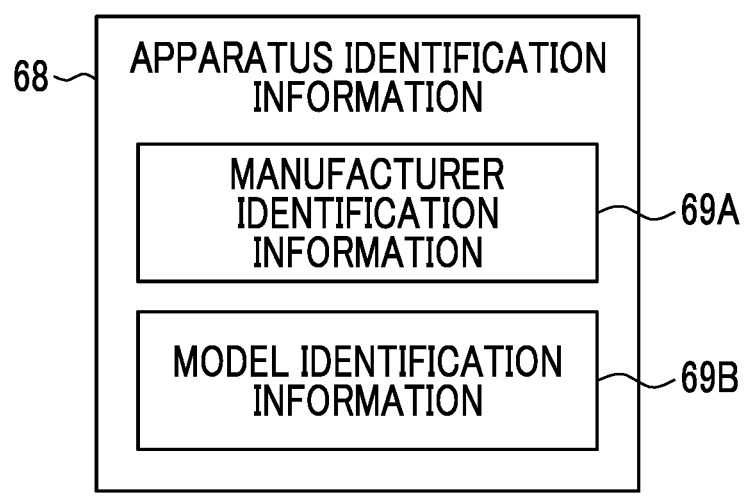
FIG. 11 is a diagram illustrating an example of apparatus identification information.

FIG. 11 illustrates an example of apparatus identification information 68 according to this embodiment. The apparatus identification information 68 is identification information for identifying the mammography apparatus that has captured the radiographic image. The apparatus identification information 68 according to this embodiment includes manufacturer identification information 69A and model identification information 69B. The manufacturer identification information 69A is information for identifying the manufacturer of the mammography apparatus and is, for example, an F company or a G company. In addition, the information indicated by the manufacturer identification information 69A is not limited to the manufacturer of the mammography apparatus and may be the manufacturer of the radiation detector 20 or the manufacturer of the corresponding console 12 in addition to the manufacturer of the mammography apparatus or instead of the manufacturer of the mammography apparatus. Further, the model identification information 69B is information for identifying the model of the mammography apparatus and is, for example, the model number or identification number of the mammography apparatus. Even in a case in which the manufacturers of the mammography apparatuses are the same, the quality of the radiographic image obtained by imaging may differ depending on the model. For example, since there are a difference in brightness, contrast, or resolution between the radiographic images obtained by imaging and a difference in frequency to be enhanced therebetween depending on the model, the quality of the radiographic image may differ. Therefore, in this embodiment, even in a case in which the models of the mammography apparatuses are different, the types of the mammography apparatuses are considered to be different.

In addition, the method by which the model selection unit 82 acquires the apparatus identification information 68 is not limited. For example, in a case in which the apparatus identification information 68 is associated with the radiographic image acquired by the acquisition unit 80, the model selection unit 82 may acquire the apparatus identification information 68 associated with the radiographic image. Further, for example, the model selection unit 82 may send an inquiry to the acquisition destination apparatus (the mammography apparatus 10 or the like), from which the acquisition unit 80 has acquired the radiographic image, to acquire the apparatus identification information 68 from the acquisition destination apparatus.

The model selection unit 82 outputs the radiographic image and the selected lesion detection model 67 to the detection unit 84.

The detection unit 84 has a function of detecting whether the lesion of the breast has not occurred (normal), is malignant, or benign, using the lesion detection model 67. The detection unit 84 inputs the radiographic image acquired by the acquisition unit 80 to the lesion detection model 67. As described above, the lesion detection model 67 outputs information indicating that the lesion is normal (no lesion has occurred), the lesion is benign, or the lesion is malignant as the detection result. The detection unit 84 outputs the detection result to the display control unit 86.

The display control unit 86 has a function of performing control to display the information indicating the detection result obtained by the detection unit 84 on the display unit 70.

Next, the operation of detecting a lesion in the image processing device 16 according to this embodiment will be described with reference to FIG. 12. The CPU 60A executes the image processing program 63B stored in the storage unit 62 such that image processing illustrated in FIG. 12 is performed.

Figure 12:
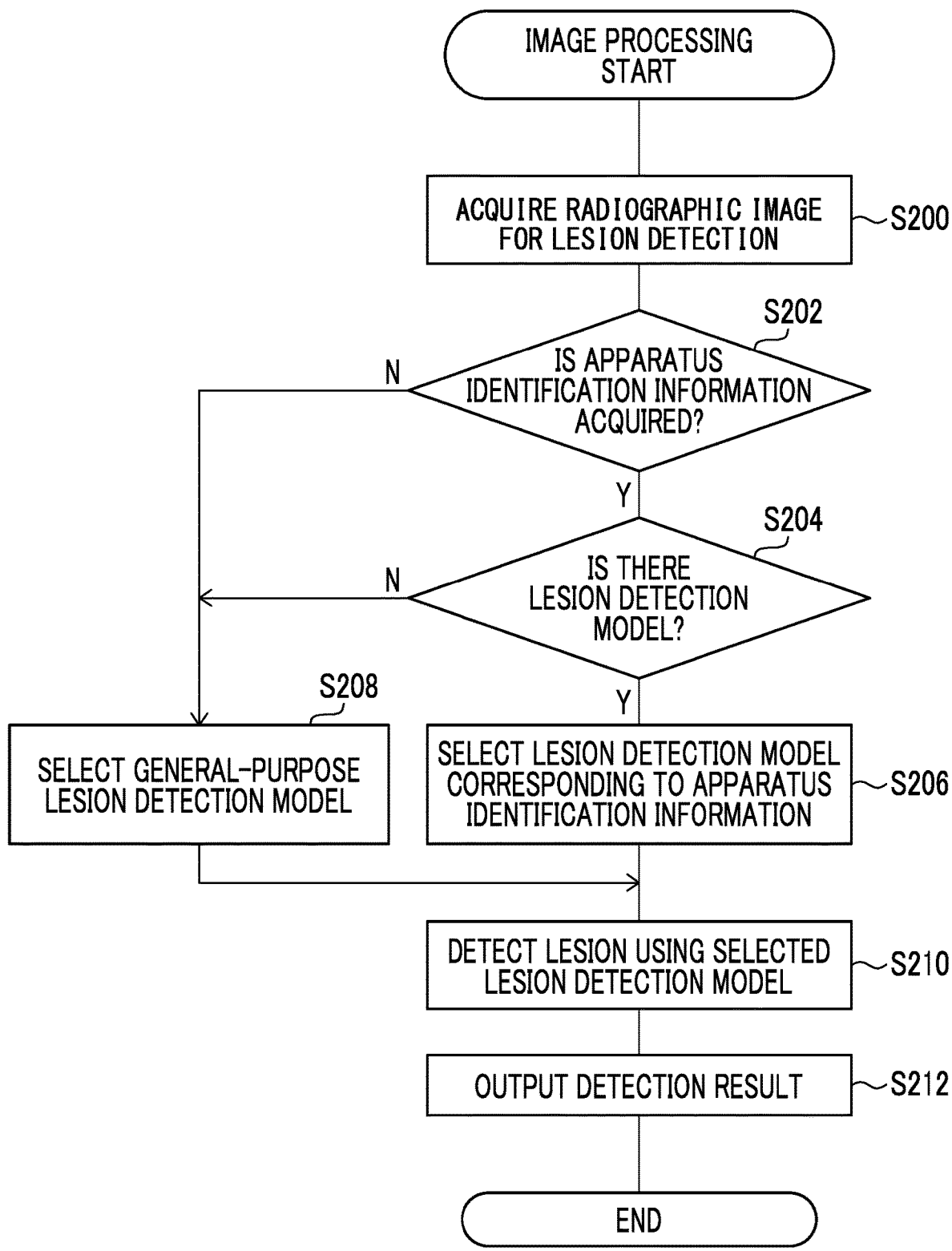
FIG. 12 is a flowchart illustrating an example of the flow of image processing by the image processing device according to the embodiment.

In Step S200 of FIG. 12, the acquisition unit 80 acquires the radiographic image to be detected from the console 12 of the mammography apparatus 10 or from the PACS 14 as described above.

Then, in Step S202, the model selection unit 82 determines whether or not the apparatus identification information 68 for identifying the mammography apparatus that has captured the radiographic image acquired in Step S200 is acquirable. In a case in which the apparatus identification information 68 is not acquirable, that is, in a case in which the mammography apparatus that has captured the radiographic image to be detected is unknown, the determination result in Step S202 is "No", and the process proceeds to Step S208. On the other hand, in a case in which the apparatus identification information 68 is acquirable, the determination result in Step S202 is "Yes", and the process proceeds to Step S204.

Then, in Step S204, the model selection unit 82 determines whether or not there is a lesion detection model 67 corresponding to the type of the mammography apparatus that has captured the radiographic image acquired in Step S200 on the basis of the apparatus identification information 68. In this embodiment, in a case in which the type of the mammography apparatus indicated by the apparatus identification information 68 does not correspond to any of apparatuses 1 to n, it is determined that the lesion detection model 67 for the mammography apparatus is not included in the lesion detection model group 66. In addition, for example, in this embodiment, correspondence relationship information (not illustrated) indicating a correspondence relationship between the manufacturer identification information 69A and the model identification information 69B and apparatuses 1 to n is stored in the storage unit 62, and the model selection unit 82 determines which of apparatuses 1 to n the type of the mammography apparatus indicated by the apparatus identification information 68 corresponds to.

In a case in which the lesion detection model 67 is not included in the lesion detection model group 66 as described above, the determination result in Step S204 is "No", and the process proceeds to Step S208. On the other hand, in a case in which the lesion detection model 67 is included in the lesion detection model group 66, the determination result in Step S204 is "Yes", and the process proceeds to Step S206.

In Step S206, the model selection unit 82 selects the lesion detection model 67 corresponding to the apparatus identification information 68 from the lesion detection model group 66 and then proceeds to Step S210. On the other hand, in a case in which the process proceeds to Step S208, the model selection unit 82 selects the general-purpose lesion detection model $67_O$ and then proceeds to Step S210.

Then, in Step S210, the detection unit 84 detects a lesion using the lesion detection model 67 selected in Step S206 or the general-purpose lesion detection model $67_O$ selected in Step S208 as described above. Specifically, the radiographic image to be detected is input to the selected lesion detection model 67 or general-purpose lesion detection model $67_O$, and the detection result is acquired from the lesion detection model 67 or from the general-purpose lesion detection model $67_O$.

Then, in Step S212, the display control unit 86 performs control to display the detection result obtained by the detection of the lesion in Step S210 on the display unit 70. In addition, the display aspect of displaying the detection result on the display unit 70 is not particularly limited. For example, the display unit 70 may display only the detection result. Further, for example, the detection result and the radiographic image to be detected may be displayed on the display unit 70.

In addition, for example, the aspects of the training of the lesion detection model 67 in the learning phase and the operation phase and the detection of the lesion using the lesion detection model 67 are examples, and various modification examples can be made. Hereinafter, some modification examples will be described.

Modification Example 1: Modification Example of Learning Phase

In the above-described embodiment, the aspect has been described in which the trained general-purpose lesion detection model $67_0$ is generated first and is retrained using the training data items $65_1$ to $65_n$ corresponding to apparatuses 1 to n to train the lesion detection models $67_1$ to $67_n$ corresponding to apparatuses 1 to n. The method for training the lesion detection models $67_1$ to $67_n$, that is, the method for generating the lesion detection models $67_1$ to $67_n$, is not limited to the above-described embodiment.

In this modification example, a modification example of the method for training the lesion detection models $67_1$ to $67_n$ will be described.

Figure 13:
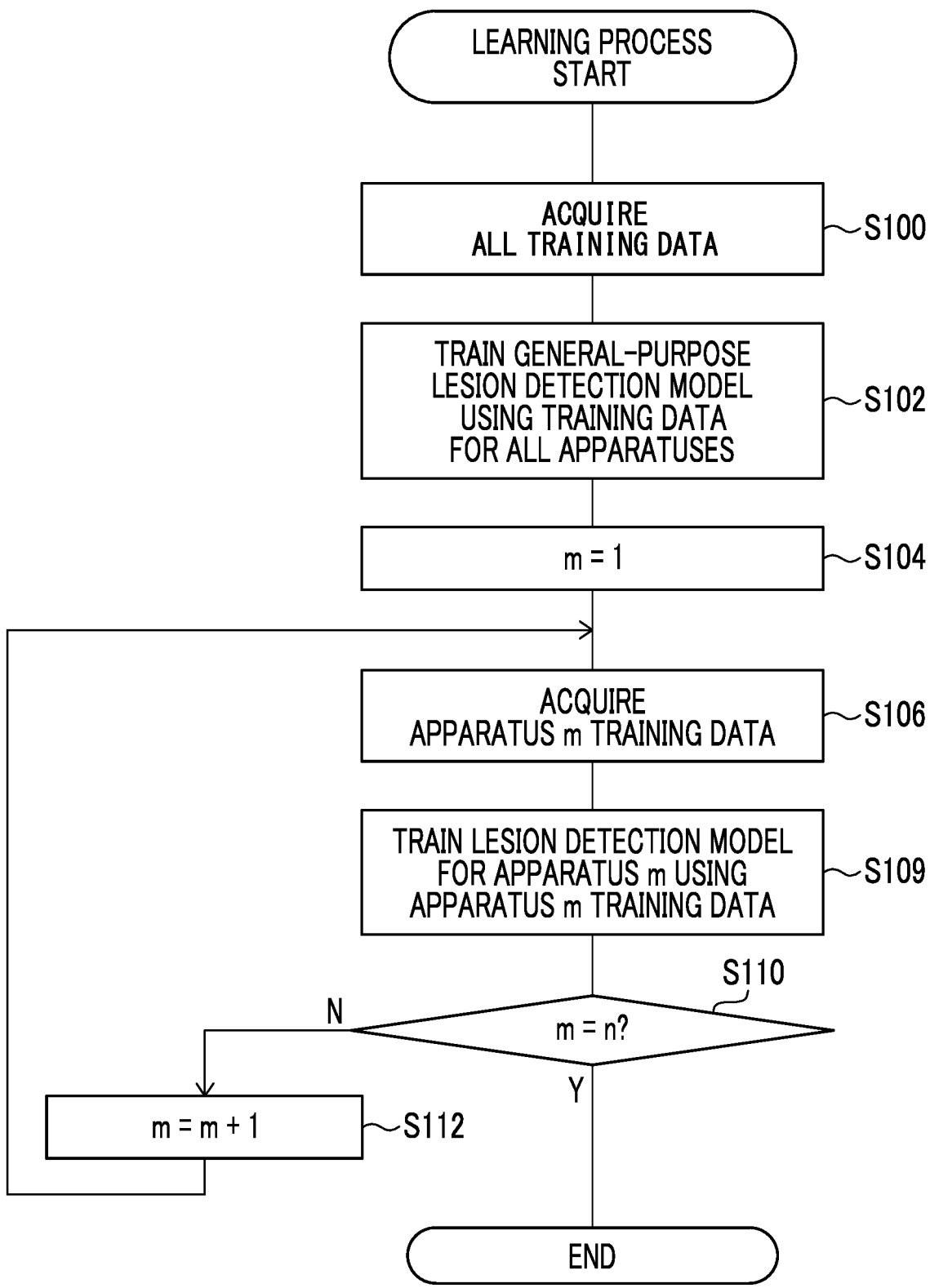
FIG. 13 is a flowchart illustrating an example of the flow of a learning process by an image processing device according to Modification Example 1.

FIG. 13 is a flowchart illustrating an example of the flow of a learning process by the image processing device 16 according to this modification example. The learning process illustrated in FIG. 13 is different from the learning process according to the above-described embodiment (see FIG. 9) in that it comprises Step S109 instead of Step S108.

As illustrated in FIG. 13, in Step S109, the lesion detection model generation unit 92 trains the lesion detection model $67_m$ for apparatus m using the apparatus m training data $65_m$ acquired in Step S106. The lesion detection model generation unit 92 repeatedly performs a series of processes of the input of the radiographic image 65A included in the apparatus m training data $65_m$ to the machine learning model, the output of each of the values of the nodes 213A to 213C included in the output layer 212 of the machine learning model, the calculation of the error between each of the values of the nodes 213A to 213C and the ground truth data 65B, the update setting of the weight, and the update of the machine learning model to train the lesion detection model $67_m$ for apparatus m. The lesion detection model generation unit 92 stores the trained lesion detection model $67_m$ for apparatus m in the storage unit 62.

As described above, in this modification example, the lesion detection model $67_1$ for apparatus 1 to the lesion detection model $67_n$ for apparatus n are trained using only each training data item 65. Therefore, the lesion detection model 67 can be trained specifically according to the type of the apparatus.

In addition, the learning process according to this modification example is not limited to the above aspect. For example, the training of the lesion detection model $67_1$ for apparatus 1 to the lesion detection model $67_n$ for apparatus n can be performed before the training of the general-purpose lesion detection model $67_0$.

Modification Example 2: Modification Example of Learning Phase

In this modification example, an aspect in which a domain adaptation method is applied to the training data 65 included in the training data group 64 to train the lesion detection models $67_1$ to $67_n$ corresponding to apparatuses 1 to n will be described.

The domain adaptation method is a technique for handling a plurality of training data items having different domains in the same manner. In this modification example, the lesion detection model generation unit 92 of the image processing device 16 converts the domain (quality) of a radiographic image 65A included in training data 65 for another apparatus into the domain (quality) of a radiographic image 65A included in training data 65 for the host apparatus, using a domain adaptation model.

Figure 14:
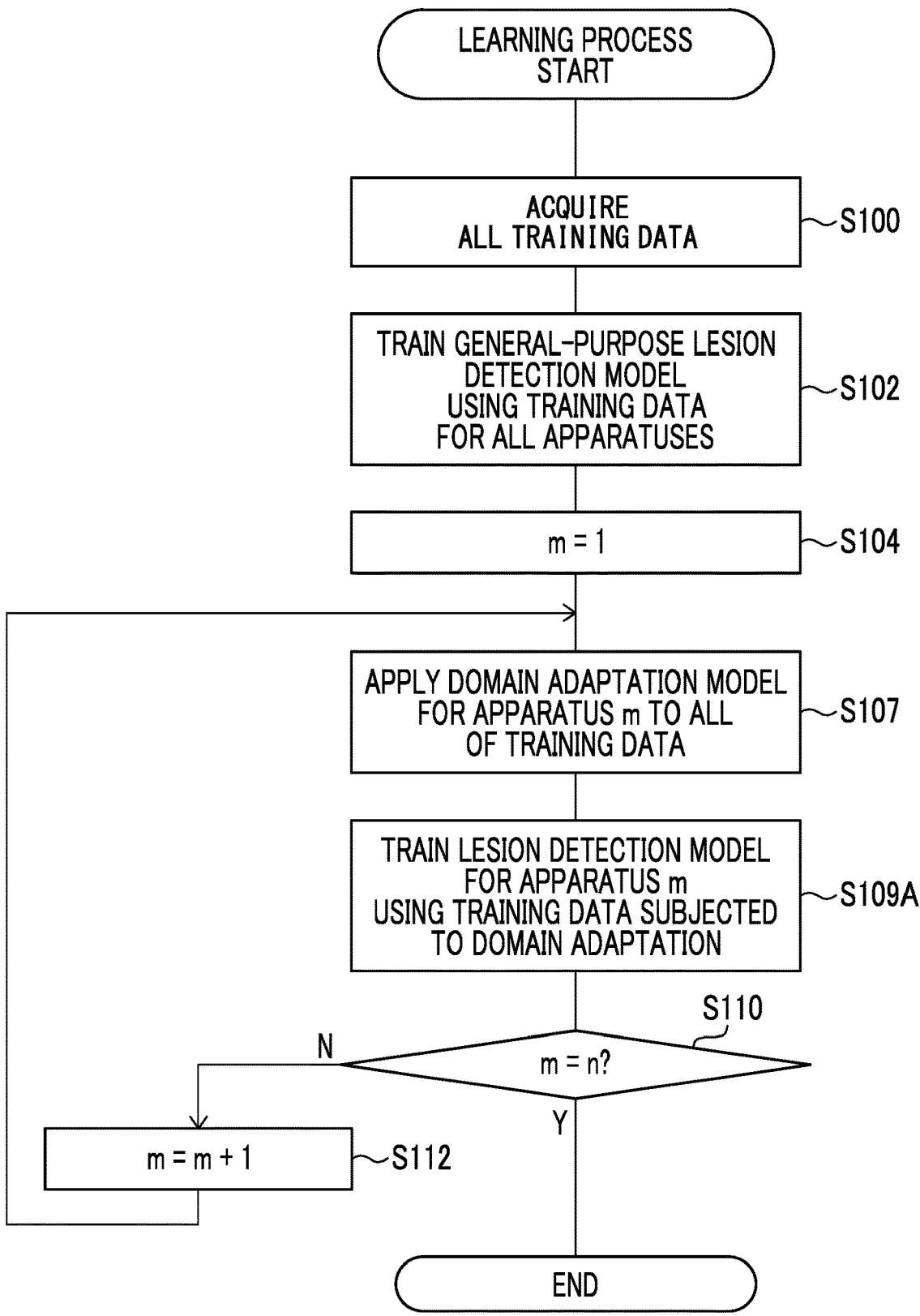
FIG. 14 is a flowchart illustrating an example of the flow of a learning process by an image processing device according to Modification Example 2.

FIG. 14 is a flowchart illustrating an example of the flow of a learning process by the image processing device 16 according to this modification example. The learning process illustrated in FIG. 14 is different from the learning process according to the above-described embodiment (see FIG. 9) in that it comprises Steps S107 and S109A instead of Steps S106 and S108.

As illustrated in FIG. 14, in Step S107, the lesion detection model generation unit 92 applies a domain adaptation model for apparatus m to the radiographic images 65A included in all of the training data 65 as described above. Therefore, the domains of the radiographic images 65A included in training data 65 other than the training data 65 for apparatus m are converted into the domain of apparatus m.

For example, in a case in which the lesion detection model $67_1$ for apparatus 1 is trained, the lesion detection model generation unit 92 applies a domain adaptation model for apparatus 1 (not illustrated) to the radiographic images 65A included in all of the training data 65 (the apparatus 1 training data $65_1$ to the apparatus n training data $65_n$) in the training data group 64 to convert the domains of all of the training data 65 into the domain of apparatus 1. As a result, the quality of the radiographic image 65A included in each of the apparatus 2 training data $65_2$ to the apparatus n training data $65_n$ is close to the image quality of apparatus 1.

Then, in Step S109A, the lesion detection model generation unit 92 trains the lesion detection model $67_m$ for apparatus m using a plurality of training data items 65 subjected to the domain adaptation in Step S107. The lesion detection model generation unit 92 repeatedly performs a series of processes of the input of the radiographic image 65A included in each training data item 65 subjected to the domain adaptation to the machine learning model, the output of each of the values of the nodes 213A to 213C included in the output layer 212 of the machine learning model, the calculation of the error between each of the values of the nodes 213A to 213C and the ground truth data 65B, the update setting of the weight, and the update of the machine learning model to train the lesion detection model $67_m$ for apparatus m. The lesion detection model generation unit 92 stores the trained lesion detection model $67_m$ for apparatus m in the storage unit 62.

As described above, in this modification example, the radiographic image 65A included in each training data item 65 other than the training data for the host apparatus can be applied as the training data 65 for the host apparatus by the domain adaptation method.

Therefore, in this modification example, it is possible to absorb the difference in the domain (image quality) depending on the type of mammography apparatus and to train the lesion detection model 67 with a larger amount of training data 65.

In addition, the learning process according to this modification example is not limited to the above-described aspect. The above is the domain adaptation method which performs a conversion process on the image included in the training data so as to be close to the image quality of a specific apparatus and which uses the acquired image group for training. In addition to this, an aspect is assumed in which a domain adaptation method of performing training such that the features of the middle layer of the network are close to those of a specific device is used.

Modification Example 3-1: Modification Example of Learning Phase and Operation Phase In this modification example, an aspect will be described in which, instead of the lesion detection model 67, a lesion detection model that is provided for each of a plurality of classes classified according to the quality of the radiographic image captured by the mammography apparatus is applied to detect a lesion.

Figure 15:
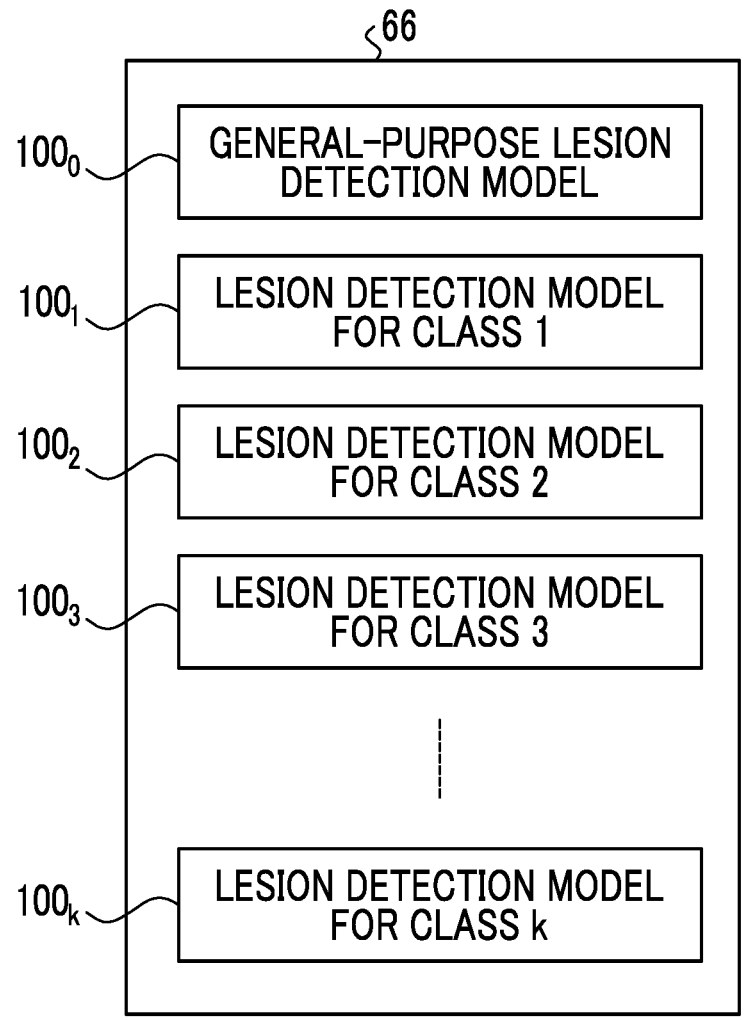
FIG. 15 is a diagram illustrating an example of a lesion detection model group according to Modification Example 3-1.

FIG. 15 illustrates an example of a lesion detection model group 66 according to this modification example. In this modification example, a lesion detection model 100 is prepared for each of the plurality of classes classified according to the quality of the radiographic image. For example, the lesion detection model group 66 according to this modification example includes a lesion detection model $100_1$ for class 1 to a lesion detection model $100_k$ for class k which corresponds to k (k≤n) types of classifications. In the example illustrated in FIG. 15, the lesion detection model $100_1$ for class 1 is a lesion detection model 100 for detecting a radiographic image classified into class 1, the lesion detection model 1002 for class 2 is a lesion detection model 100 for detecting a radiographic image classified into class 2, the lesion detection model 1003 for class 3 is a lesion detection model 100 for detecting a radiographic image classified into class 3, and the lesion detection model $100_k$ for class k is a lesion detection model 100 for detecting a radiographic image classified into class k.

Further, as illustrated in FIG. 15, the lesion detection model group 66 according to this embodiment includes a general-purpose lesion detection model $100_0$. The general-purpose lesion detection model $100_0$ is a lesion detection model 100 that is generally used in a case in which apparatus identification information is not acquirable or does not correspond to any of apparatuses 1 to n to which an input is assumed. For example, the general-purpose lesion detection model $100_0$ according to this modification example is the same as the general-purpose lesion detection model $67_0$ according to the above-described embodiment.

First, a learning phase for training the lesion detection model 100 will be described.

Figure 16:
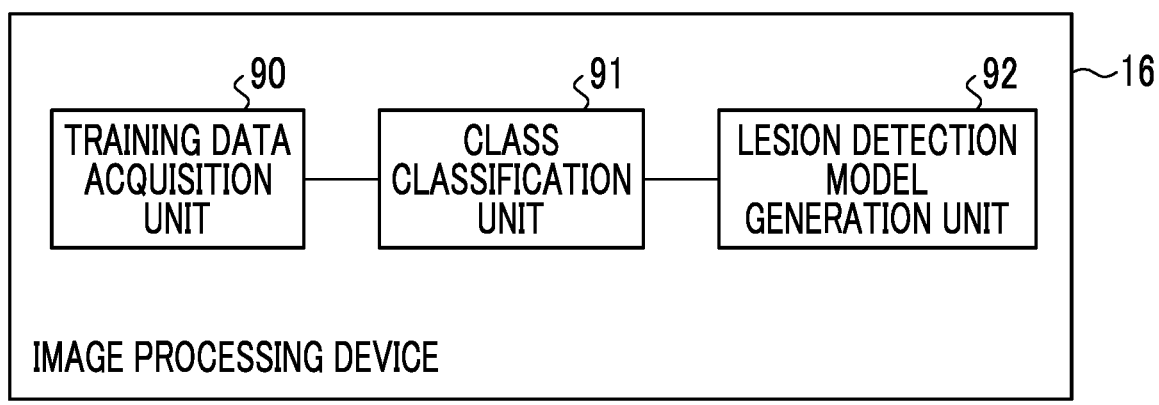
FIG. 16 is a functional block diagram illustrating an example of a configuration related to a function of generating a lesion detection model in an image processing device according to Modification Example 3-1.

FIG. 16 is a functional block diagram illustrating an example of a configuration related to a function of generating the lesion detection model 100 in the image processing device 16 according to this modification example. As illustrated in FIG. 16, the image processing device 16 is different from the image processing device 16 (see FIG. 8) according to the above-described embodiment in that it further comprises a class classification unit 91.

Figure 17:
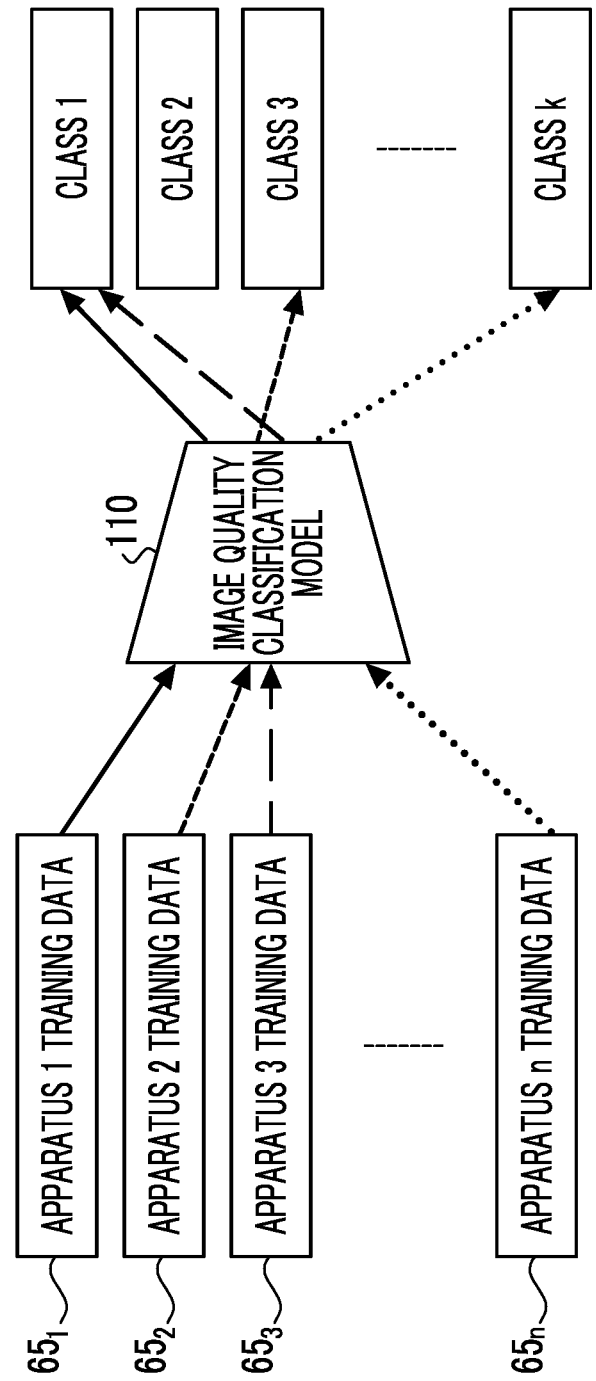
FIG. 17 is a diagram illustrating class classification corresponding to image quality of training data in Modification Example 3-1.

The class classification unit 91 has a function of classifying the radiographic image 65A included in the training data 65 into any of classes 1 to k. As illustrated in FIG. 17, the class classification unit 91 classifies the training data 65 into any of classes 1 to k using an image quality classification model 110. In the example illustrated in FIG. 17, the apparatus 1 training data $65_1$ is classified into class 1 by the image quality classification model 110, the apparatus 2 training data $65_2$ is classified into class 3 by the image quality classification model 110, the apparatus 3 training data $65_3$ is classified into class 1 by the image quality classification model 110, and the apparatus n training data $65_n$ is classified into class k by the image quality classification model 110.

In addition, for example, a model using a neural network (NN) or the like can be applied as the image quality classification model 110. The method by which the class classification unit 91 classifies the training data 65 into a class is not limited to the aspect using the image quality classification model 110. For example, the training data 65 is classified into a class by a process of comparing the means or variances of the pixels of the breast (object) in the radiographic image, a process of performing frequency decomposition on a signal in the breast and comparing the means or variances of each frequency band, or the like.

Figure 18:
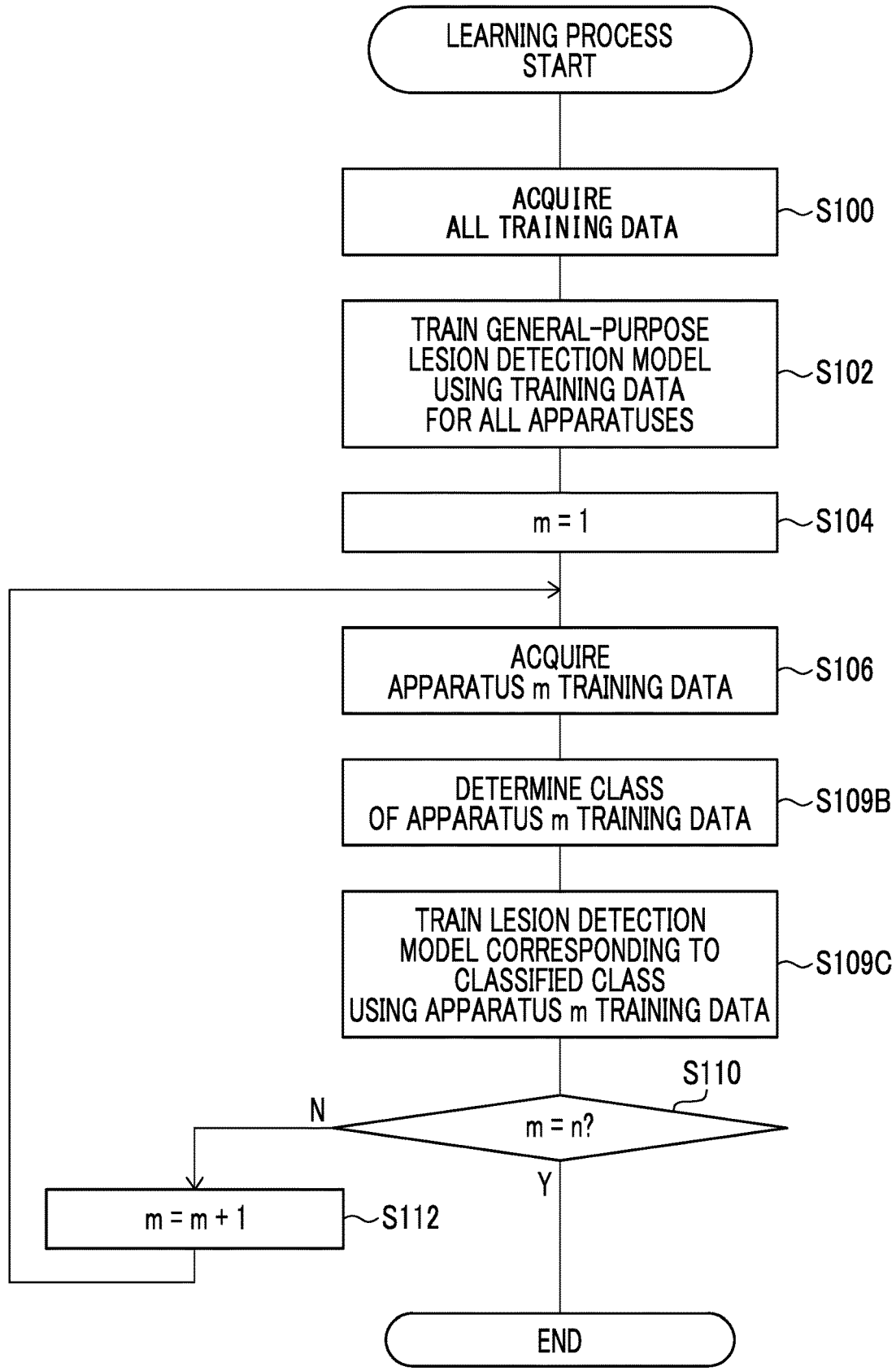
FIG. 18 is a flowchart illustrating an example of the flow of a learning process by the image processing device according to Modification Example 3-1.

FIG. 18 is a flowchart illustrating an example of the flow of a learning process by the image processing device 16 according to this modification example. The learning process illustrated in FIG. 18 is different from the learning process according to the above-described embodiment (see FIG. 9) in that it comprises Steps S109B and S109C instead of Step S108.

In addition, in Step S102 of the learning process according to this modification example, a learning method and the like are the same as those in the learning process according to the above-described embodiment (see FIG. 9) except that the general-purpose lesion detection model $100_0$ is trained.

As illustrated in FIG. 18, in Step S109B, the class classification unit 91 determines the class of the apparatus m training data $65_m$ acquired in Step S106 using the image quality classification model 110 as described above. Specifically, the class classification unit 91 inputs the radiographic image 65A included in the apparatus m training data $65_m$ to the image quality classification model 110 and acquires a class which is the classification result. The class classification unit 91 stores the classification result in the storage unit 62 or the like so as to be associated with apparatus m.

Then, in Step S109C, the lesion detection model generation unit 92 trains the lesion detection model 100 corresponding to the classified class, using the apparatus m training data $65_m$. For example, in the above-described example, the apparatus 1 training data $65_1$ is classified into class 1. Therefore, the lesion detection model generation unit 92 repeatedly performs a series of processes of the input of the radiographic image 65A included in the apparatus 1 training data $65_1$ to the machine learning model, the output of each of the values of the nodes 213A to 213C included in the output layer 212 of the machine learning model, the calculation of the error between each of the values of the nodes 213A to 213C and the ground truth data 65B, the update setting of the weight, and the update of the machine learning model to train the lesion detection model $100_1$ for class 1.

As described above, in the learning phase according to this modification example, the lesion detection model 100 corresponding to the quality of the radiographic image to be detected is generated.

Next, the operation phase according to this modification example will be described.

The model selection unit 82 according to this modification example further has a function of determining which of classes 1 to k the radiographic image to be detected, which has been acquired by the acquisition unit 80, is classified into. The model selection unit 82 selects the lesion detection model 100 corresponding to the determined classification class.

Figure 19:
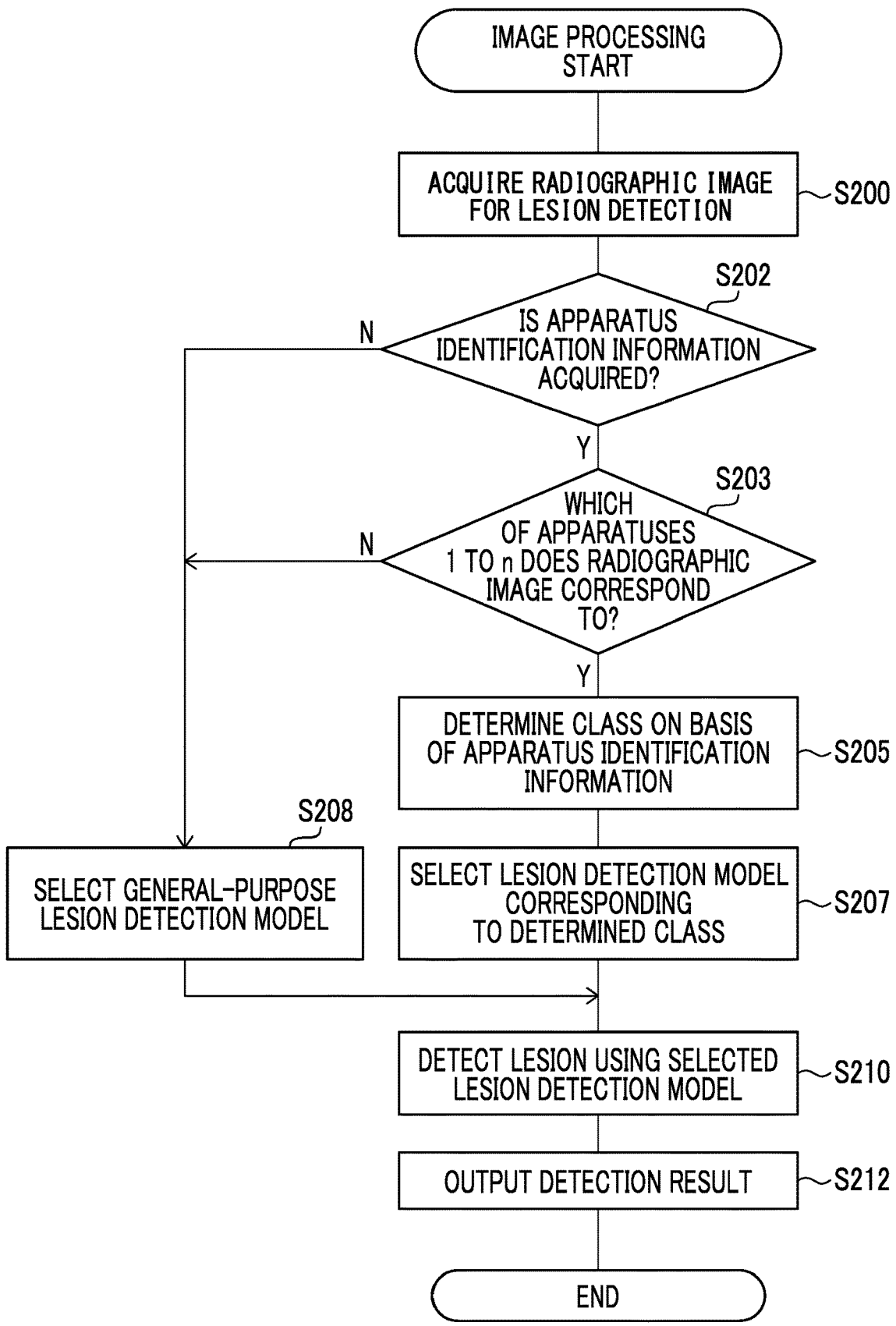
FIG. 19 is a flowchart illustrating an example of the flow of image processing by the image processing device according to Modification Example 3-1.

FIG. 19 is a flowchart illustrating an example of the flow of image processing by the image processing device 16 according to this modification example. The image processing illustrated in FIG. 19 is different from the image processing according to the above-described embodiment (see FIG. 12) in that it comprises Steps S203 to S207 instead of Steps S204 and S206.

As illustrated in FIG. 19, in Step S203, the model selection unit 82 determines which of apparatuses 1 to n the radiographic image to be detected, which has been acquired in Step S200, is classified into, using the apparatus identification information 68, as described above. In a case in which the type of the mammography apparatus indicated by the apparatus identification information 68 does not correspond to any of apparatuses 1 to n, the determination result in Step S203 is "No", and the process proceeds to Step S208. On the other hand, in a case in which the type of the mammography apparatus indicated by the apparatus identification information 68 corresponds to any of apparatuses 1 to n, the determination result in Step S203 is "Yes", and the process proceeds to Step S205.

In Step S205, the model selection unit 82 determines the class into which the radiographic image to be detected is classified, on the basis of the apparatus identification information 68. Specifically, the model selection unit 82 acquires the classes associated with apparatuses 1 to n, which are the types of mammography apparatuses indicated by the apparatus identification information 68, with reference to the storage unit 62.

Then, in Step S207, the model selection unit 82 selects the lesion detection model 100 corresponding to the class determined in Step S205 from the lesion detection model group 66 and then proceeds to Step S210.

As described above, in the operation phase according to this modification example, the lesion is detected by the lesion detection model 100 corresponding to the quality of the radiographic image to be detected.

As described above, in this modification example, the lesion detection model 100 corresponding to the quality of the radiographic image is used in a case in which the lesion included in the radiographic image is detected. In the training of the lesion detection model 67, the number of training data items 65 can be larger than that in a case in which the lesion detection models 67 corresponding to apparatuses 1 to n are used. Therefore, it is possible to further improve the accuracy of the lesion detection model 100. In addition, the number of lesion detection models 100 can be less than the number of lesion detection models 67. Further, it is unlikely that the apparatus will change frequently. Therefore, an operation is also assumed in which, after the determination of the class of the apparatus is performed once, the lesion detection model 100 can be selected using the previous determination result.

Modification Example 3-2: Modification Example of Modification Example 3-1

In this modification example, a modification example of the above-described Modification Example 3-1 will be described.

A lesion detection model group 66 (not illustrated) according to this modification example is different from the lesion detection model group 66 (see FIG. 15) according to Modification Example 3-1 in that it does not include the general-purpose lesion detection model $100_0$.

In addition, a learning process according to this modification example is different from the learning process (see FIG. 18) according to Modification Example 3-1 in that it does not comprise Steps S100 and S102. That is, in this modification example, the general-purpose lesion detection model $100_0$ is not generated.

Further, an operation phase according to this modification example will be described.

Figure 20:
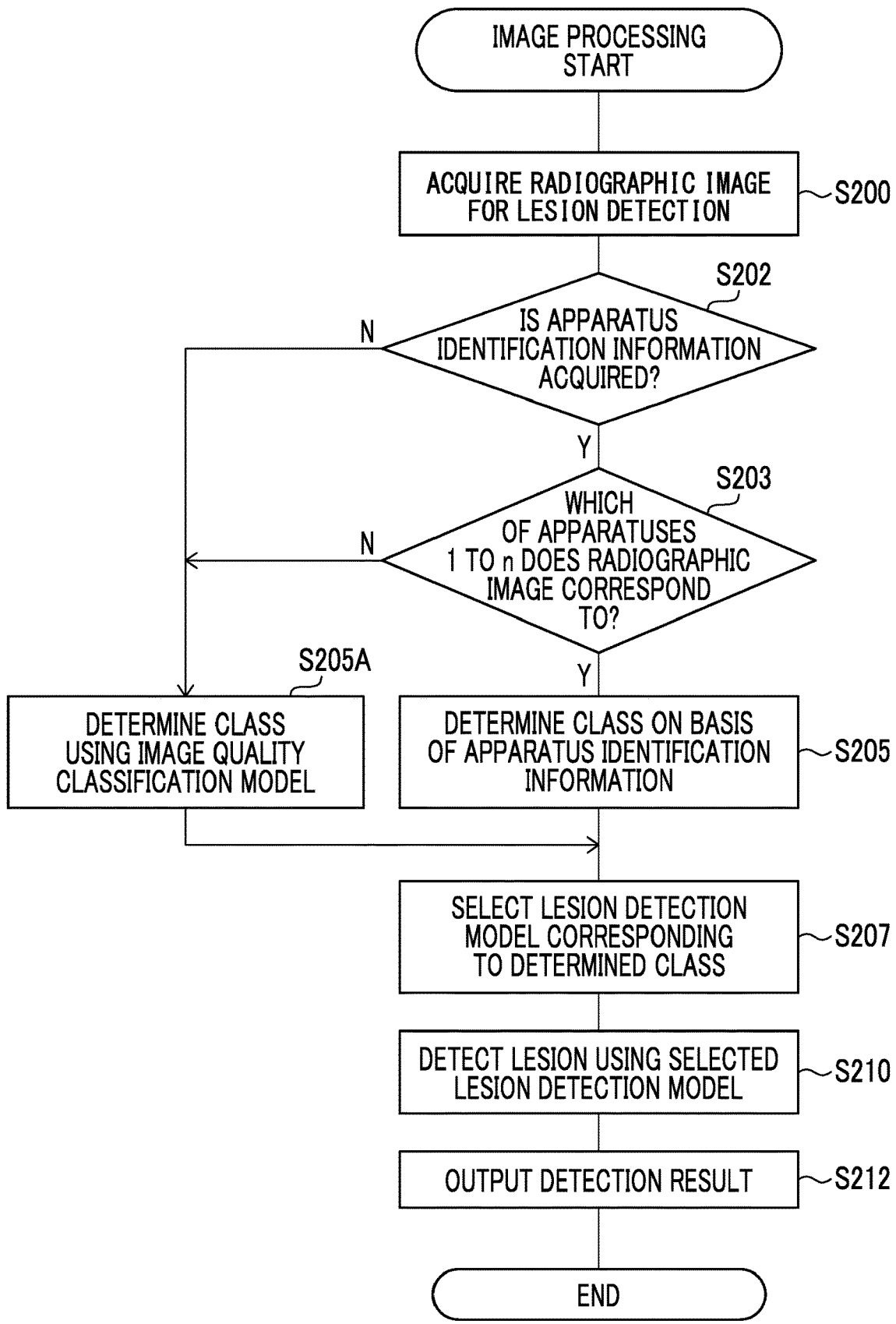
FIG. 20 is a flowchart illustrating an example of the flow of image processing by an image processing device according to Modification Example 3-2.

FIG. 20 is a flowchart illustrating an example of the flow of image processing by the image processing device 16 according to this modification example. The image processing illustrated in FIG. 20 is different from the image processing (see FIG. 19) according to Modification Example 3-1 in that it comprises Step S205A instead of Step S208.

As illustrated in FIG. 20, in a case in which the determination result in Step S202 is "No" and the determination in Step S203 is "No", the process proceeds to Step S205A.

In Step S205A, the lesion detection model generation unit 92 determines the class into which the radiographic image to be detected is classified by the image quality classification model 110. Specifically, the model selection unit 82 inputs the radiographic image to be detected to the image quality classification model 110 and acquires a class which is an output classification result.

As described above, in the operation phase according to this modification example, in a case in which the apparatus identification information 68 is not acquirable from the radiographic image to be detected or does not correspond to any of apparatuses 1 to n, the class to be classified is determined on the basis of the quality of the radiographic image. Therefore, according to this modification example, it is possible to select an appropriate lesion detection model 100 corresponding to the quality of the radiographic image to be detected.

As described above, the image processing device 16 according to the above-described embodiment comprises the CPU 60A. The CPU 60A acquires the radiographic image to be detected, acquires the apparatus identification information 68 for identifying the mammography apparatus that has captured the radiographic image to be detected, selects any one of a plurality of lesion detection models 67 that detect a lesion from the radiographic images on the basis of the apparatus identification information 68, and detects the lesion from the radiographic image to be detected, using the selected lesion detection model 67.

For example, in a case in which the manufacturers, models, or the like of the mammography apparatuses that have captured the radiographic images are different, the qualities of the obtained radiographic images may differ even though the radiographic images are captured under the same imaging conditions. The accuracy of the lesion detection model that detects the lesion from the radiographic image may be reduced by the influence of the difference in quality between the radiographic images. Specifically, since a radiation dose, image processing, or the like varies between the mammography apparatuses, there are, for example, a difference in brightness, contrast, and resolution between the obtained radiographic images and a difference in frequency to be enhanced therebetween. The lesion detection model 67 has a high detection power for the distribution learned at the time of learning, but is not capable of sufficiently responding to the distribution that has not been learned at the time of learning. Therefore, in a case in which a radiographic image having a quality different from the distribution of the radiographic image group used by the lesion detection model 67 at the time of learning is input, the lesion detection model 67 is not capable of responding to the radiographic image, and the detection power for the lesion is reduced.

In contrast, for the lesion detection models 67 and 100 according to the above-described aspects, even in a case in which the manufacturers, models, or the like of the mammography apparatuses that have captured the radiographic images are different and there is a difference in quality between the obtained radiographic images, it is possible to suppress a reduction in the accuracy of the lesion detection models 67 and 100. Further, since a lesion is detected using the lesion detection model 67 or 100 corresponding to the mammography apparatus that has captured the radiographic image to be detected, it is possible to improve the accuracy of detection.

Therefore, according to the image processing device 16 of the above-described embodiment, it is possible to accurately detect a lesion from a medical image using the lesion detection model.

In addition, in the above-described embodiment, the aspect in which a radiographic image is applied as an example of the medical image according to the present disclosure has been described. However, the medical image is not limited to the radiographic image. For example, the medical image may be an ultrasound image or the like. Further, the radiographic image may be a radiographic image obtained by normal imaging, a projection image obtained by tomosynthesis imaging, a tomographic image generated from the projection images, or the like. Further, in the above-described embodiment, the aspect in which the mammography apparatus is applied as an example of the imaging apparatus according to the present disclosure has been described. However, the imaging apparatus is not limited to the mammography apparatus and may be any imaging apparatus corresponding to the object from which a lesion is detected.

Further, in the above-described embodiment, the aspect has been described in which whether the lesion is normal, benign, or malignant is detected as an example of the content of the detection of the lesion according to the present disclosure. However, the content of the detection is not limited to this aspect. For example, the content of the detection may be the degree of malignancy of the lesion or the lesion itself such as a tumor or a calcification.

Further, for example, in addition to the model to which a convolutional neural network (CNN) is applied as described above, U-Net which is an encoder-decoder model using the CNN may be applied as the lesion detection model 67. Furthermore, the CNN may be a three-dimensional CNN. As described above, as the lesion detection model 67, an appropriate model may be applied according to the type of the medical image to be detected or to the content of the detection.

In addition, in the above-described embodiment, the aspect has been described in which the image processing device 16 trains the lesion detection model group 66 and detects a lesion using the lesion detection model group 66. However, a learning device other than the image processing device 16 may train the lesion detection model group 66. That is, the device that trains the lesion detection model group 66 may be different from the device that detects the lesion using the lesion detection model group 66.

Furthermore, in the above-described embodiment, for example, the following various processors can be used as a hardware structure of processing units performing various processes, such as the acquisition unit 80, the model selection unit 82, the detection unit 84, and the display control unit 86, and as a hardware structure of processing units performing various processes, such as the training data acquisition unit 90 and the lesion detection model generation unit 92. The various processors include, for example, a CPU which is a general-purpose processor executing software (programs) to function as various processing units as described above, a programmable logic device (PLD), such as a field programmable gate array (FPGA), which is a processor whose circuit configuration can be changed after manufacture, and a dedicated electric circuit, such as an application specific integrated circuit (ASIC), which is a processor having a dedicated circuit configuration designed to perform a specific process.

One processing unit may be configured by one of the various processors or by a combination of two or more processors of the same type or different types (for example, a combination of a plurality of FPGAs or a combination of a CPU and an FPGA). Further, a plurality of processing units may be configured by one processor.

A first example of the configuration in which a plurality of processing units are configured by one processor is an aspect in which one processor is configured by a combination of one or more CPUs and software and functions as a plurality of processing units. A representative example of this aspect is a client computer or a server computer. A second example of the configuration is an aspect in which a processor that implements the functions of the entire system including a plurality of processing units using one integrated circuit (IC) chip is used. A representative example of this aspect is a system-on-chip (SoC). As such, various processing units are configured using one or more of the various processors as the hardware structure.

In addition, specifically, an electric circuit (circuitry) obtained by combining circuit elements, such as semiconductor elements, can be used as the hardware structure of the various processors.

Further, in the above-described embodiment, the aspect in which the learning program 63A and the image processing program 63B are stored (installed) in the storage unit 62 in advance has been described. However, the present disclosure is not limited thereto. Each of the learning program 63A and the image processing program 63B may be recorded on a recording medium, such as a compact disc read only memory (CD-ROM), a digital versatile disc read only memory (DVD-ROM), or a universal serial bus (USB) memory, and then be provided. Furthermore, each of the learning program 63A and the image processing program 63B may be downloaded from an external device through the network.

What is claimed is:

1. A mammography imaging system, comprising:
a mammography imaging apparatus that captures a mammography image; and a mammography image processing device including at least one processor, wherein the processor acquires the mammography image, acquires apparatus identification information for identifying the mammography imaging apparatus that has captured the mammography image,
selects any one of a plurality of lesion detection models, which detect a lesion from the mammography image, on the basis of the apparatus identification information, the plurality of lesion detection models detecting whether a lesion in the mammography image is normal, benign or malignant, calculates at least one of a first probability that the lesion in the mammographic image is normal, a second probability that the lesion is benign, and a third probability that the lesion is malignant, and displays information indicating that the lesion is normal, the lesion is benign or the lesion is malignant, on a display, according to at least one of the first probability, the second probability and the third probability, wherein each of the plurality of lesion detection models has been trained to improve in accuracy of lesion detection by the mammography imaging system for one of a plurality of classes, the classes being types of a plurality of mammography imaging apparatuses that have captured mammography images, wherein the processor determines a class, among the plurality of classes, that the apparatus identification information is classified into, and selects any one of the plurality of lesion detection models corresponding to the determined class, wherein the plurality of lesion detection models include a lesion detection model corresponding to a type of the mammography imaging apparatus and a general-purpose lesion detection model regardless of the type of the mammography imaging apparatus, and wherein, in a case in which the lesion detection model corresponding to the type of the mammography imaging apparatus identified by the apparatus identification information is not included in the plurality of lesion detection models, the processor selects the general-purpose lesion detection model.

2. The mammography imaging system according to claim 1 wherein, in a case in which the apparatus identification information is not acquirable, the processor selects the general-purpose lesion detection model.

3. The mammography imaging system according to claim 1, wherein the apparatus identification information includes manufacturer identification information for identifying a manufacturer of the mammography imaging apparatus, and the processor selects any one of the plurality of lesion detection models on the basis of the manufacturer identification information.

4. The mammography imaging system according to claim 1, wherein the apparatus identification information includes model identification information for identifying a model of the mammography imaging apparatus, and the processor selects any one of the plurality of lesion detection models on the basis of the model identification information.

5. A mammography imaging method that is executed by a computer, the method comprising: capturing a mammography image to be detected via a mammography imaging apparatus; acquiring apparatus identification information for identifying the mammography imaging apparatus that has captured the mammography image to be detected; selecting any one of a plurality of lesion detection models, which detect a lesion from the mammography image, on the basis of the apparatus identification information, the plurality of lesion detection models detecting whether a lesion in the mammography image is normal, benign or malignant;

calculating at least one of a first probability that the lesion in the mammographic image is normal, a second probability that the lesion is benign, and a third probability that the lesion is malignant; and displaying information indicating that the lesion is normal, the lesion is benign or the lesion is malignant, on a display, according to at least one of the first probability, the second probability and the third probability, wherein each of the plurality of lesion detection models has been trained to improve in accuracy of lesion detection for one of a plurality of classes, the classes being types of a plurality of mammography imaging apparatuses that have captured mammography images, wherein a class is determined, among the plurality of classes, that the apparatus identification information is classified into, and any one of the plurality of lesion detection models corresponding to the determined class is selected, wherein the plurality of lesion detection models include a lesion detection model corresponding to a type of the mammography imaging apparatus and a general-purpose lesion detection model regardless of the type of the mammography imaging apparatus, and wherein, in a case in which the lesion detection model corresponding to the type of the mammography imaging apparatus identified by the apparatus identification information is not included in the plurality of lesion detection models, the general-purpose lesion detection model is selected.

6. A non-transitory computer-readable storage medium storing a mammography imaging program that causes a computer to execute a process comprising: capturing a mammography image to be detected via a mammography imaging apparatus; acquiring apparatus identification information for identifying the mammography imaging apparatus that has captured the mammography image to be detected; selecting any one of a plurality of lesion detection models, which detect a lesion from the mammography image, on the basis of the apparatus identification information, the plurality of lesion detection models detecting whether a lesion in the mammography image is normal, benign or malignant;

calculating at least one of a first probability that the lesion in the mammographic image is normal, a second probability that the lesion is benign, and a third probability that the lesion is malignant; and displaying information indicating that the lesion is normal, the lesion is benign or the lesion is malignant, on a display, according to at least one of the first probability, the second probability and the third probability, wherein each of the plurality of lesion detection models has been trained to improve in accuracy of lesion detection for one of a plurality of classes, the classes being types of a plurality of mammography imaging apparatuses that have captured mammography images, wherein a class is determined, among the plurality of classes, that the apparatus identification information is classified into, and any one of the plurality of lesion detection models corresponding to the determined class is selected, wherein the plurality of lesion detection models include a lesion detection model corresponding to a type of the mammography imaging apparatus and a general-purpose lesion detection model regardless of the type of the mammography imaging apparatus, and wherein, in a case in which the lesion detection model corresponding to the type of the mammography imaging apparatus identified by the apparatus identification information is not included in the plurality of lesion detection models, the general-purpose lesion detection model is selected.

* * * * *